(12) United States Patent
Kinney et al.

(10) Patent No.: US 10,147,306 B2
(45) Date of Patent: Dec. 4, 2018

(54) DETECTION OF AUTHORIZED USER PRESENCE AND HANDLING OF UNAUTHENTICATED MONITORING SYSTEM COMMANDS

(71) Applicant: Alarm.com Incorporated, Tysons, VA (US)

(72) Inventors: Abraham Joseph Kinney, Vienna, VA (US); Daniel Todd Kerzner, McLean, VA (US); David James Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/821,474

(22) Filed: Nov. 22, 2017

(65) Prior Publication Data

US 2018/0144615 A1 May 24, 2018

Related U.S. Application Data

(60) Provisional application No. 62/426,015, filed on Nov. 23, 2016.

(51) Int. Cl.
*G05B 19/00* (2006.01)
*G08B 29/02* (2006.01)
(Continued)

(52) U.S. Cl.
CPC ......... *G08B 29/02* (2013.01); *G06K 9/00362* (2013.01); *G06K 9/00771* (2013.01);
(Continued)

(58) Field of Classification Search
CPC ......... H04L 63/10; H04L 63/18; H04L 67/12; H04Q 2209/40
(Continued)

(56) References Cited

U.S. PATENT DOCUMENTS 8,510,255 B2 8/2013 Fadell et al.
9,501,924 B2 11/2016 Kennedy et al.
(Continued)

FOREIGN PATENT DOCUMENTS

WO WO 2016/182696 11/2016
WO WO 2017/142726 8/2017

OTHER PUBLICATIONS

International Search Report and Written Opinion in International Application No. PCT/US2017/63043, dated Feb. 16, 2018, 8 pages.

*Primary Examiner* — Fabricio R Murillo Garcia
(74) *Attorney, Agent, or Firm* — Fish & Richardson P.C.

(57) ABSTRACT

Techniques are described for detecting and handling unauthenticated commands in a property monitoring system. In some implementations, a monitoring system may include sensors located throughout a property, a monitoring control unit, and an input device. The monitoring control unit may be configured to receive data collected by the sensors, as well as an input command detected by the input device. For an input command that does not include authentication information, the monitoring control unit may generate property state information based on the sensor data, then analyze the property state data and the input command against one or more rules that relate to authorization of unauthenticated commands. Based on the analysis, the monitoring control unit may determine whether to perform the action corresponding to the input command or whether to perform another action, for example, generating and providing a notification or authorization request to a user.

20 Claims, 6 Drawing Sheets

(51) Int. Cl.
   *G10L 17/22* (2013.01)
   *G06K 9/00* (2006.01)
   *G10L 15/22* (2006.01)

(52) U.S. Cl.
   CPC .............. *G10L 15/22* (2013.01); *G10L 17/22* (2013.01); *G10L 2015/223* (2013.01)

(58) Field of Classification Search
   USPC ......................................................... 340/5.2
   See application file for complete search history.

(56) References Cited

U.S. PATENT DOCUMENTS

| | | | |
|---|---|---|---|
| 2004/0212500 A1* | 10/2004 | Stilp | G08B 19/005 340/541 |
| 2012/0310376 A1 | 12/2012 | Krumm et al. | |
| 2014/0317029 A1 | 10/2014 | Matsuoka et al. | |
| 2014/0320312 A1 | 10/2014 | Sager et al. | |
| 2014/0324192 A1 | 10/2014 | Baskaran et al. | |
| 2014/0365773 A1 | 12/2014 | Gerhardt et al. | |
| 2015/0156030 A1 | 6/2015 | Fadell et al. | |
| 2015/0309487 A1 | 10/2015 | Lyman | |
| 2015/0347916 A1 | 12/2015 | Warren et al. | |
| 2016/0165405 A1* | 6/2016 | Shinozuka | H04W 4/04 455/456.1 |
| 2016/0192040 A1* | 6/2016 | Suresh | H04Q 9/00 340/870.07 |
| 2016/0261931 A1 | 9/2016 | Fadell et al. | |

\* cited by examiner

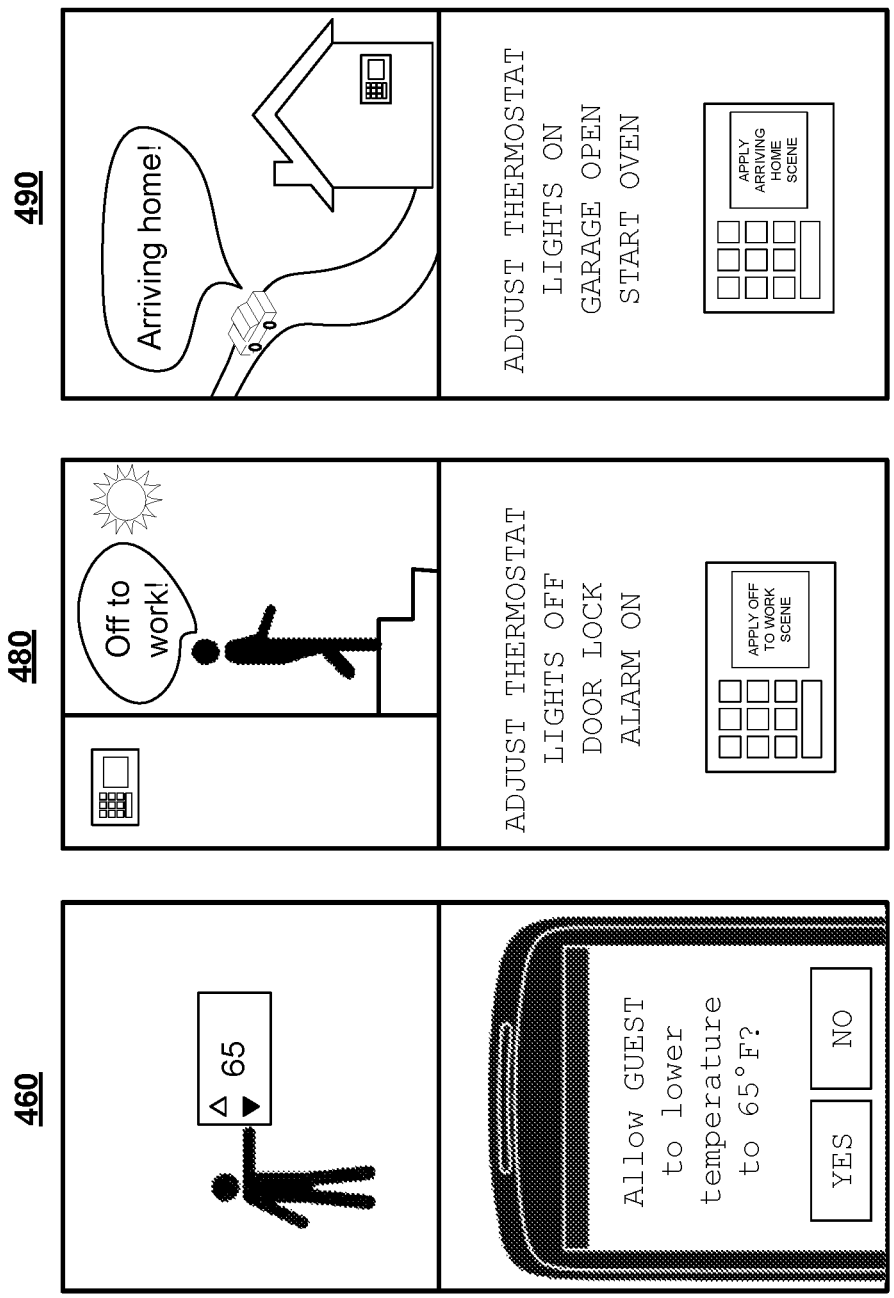

DETECTION OF AUTHORIZED USER PRESENCE AND HANDLING OF UNAUTHENTICATED MONITORING SYSTEM COMMANDS

CROSS-REFERENCE TO RELATED APPLICATION

This application claims the benefit of U.S. Provisional Patent Application No. 62/426,015 filed on Nov. 23, 2016, which is incorporated herein by reference in its entirety.

TECHNICAL FIELD

This disclosure application relates generally to property monitoring technology.

BACKGROUND

A property monitoring system may perform actions based on input user commands. In some cases, the input command may not include authentication information.

SUMMARY

Techniques are described for detecting and handling unauthenticated commands in a property monitoring system. In some implementations, a monitoring system may include one or more sensors that are located throughout a property, where those sensors may include cameras, motion detectors, and other sensing devices. The monitoring system may also include a monitoring control unit, where the monitoring control unit is configured to receive data collected by the sensors and generate property state information based on the received data. The monitoring system may further include an input device, such as a microphone or smart speaker system, which may detect an input command, where the input command does not include authentication information. In some examples, the monitoring control unit may be receive the unauthenticated input command, or data identifying the unauthenticated input command, from the input device. The monitoring control unit may then analyze the property state information and the input command against one or more rules that are related to authorizing unauthenticated input commands. Based on this analysis, the monitoring control unit may determine whether to perform the action corresponding to the input command or perform another action that is different than the action that corresponds to the input command.

The action that is different than the action that corresponds to the input command may be, for example, generating a notification, generating an authorization request, or providing the notification or authorization request to a user's computing device. In some cases, the action that is different the action corresponding to the input command may be generating an alarm condition.

In some implementations, the monitoring system may be in an armed state, the property state information may indicate that an expected number of occupants are located in a particular area of the property, and the input command, which is provided from a location outside of the particular area of the property, requests to disarm the monitoring system. In some cases, the property state information may also indicate that the particular are of the property in which the occupants are located is dark. Based on analyzing the property state information and the input command against the one or more rules, the monitoring control unit may determine that the command to disarm the monitoring system is not authorized and generate an alarm condition.

In some implementations, the property state information may indicate that a user is located inside the property, the data collected by the sensors includes an image of the user, and the input command is a voice command uttered by the user. Here, the monitoring control unit may analyze the image of the user, determine that the user is an authorized user, and determine that the voice command is authorized. As a result, the monitoring control unit may determine to perform the action that corresponds to the input command based on determining that the voice command is authorized.

In some implementations, the input command may be a voice command uttered by a user located inside the property, where the property state information indicates that the user is located inside a bedroom of the property and that the user was likely sleeping before uttering the voice command. Here, the monitoring control unit may determine that the voice command is authorized and determine to perform the action that corresponds to the input command. In some cases, the monitoring control unit may perform one or more actions, including disarming the monitoring system, activating one or more lights that are located in the property, raising one or more window coverings that are located in the property, and activating an appliance that is located in the property.

In some implementations, the property state information may indicate that a resident of the property is outside of the property and the unauthenticated input command comprises a command to adjust a device of the property. The monitoring control unit may be configured to determine a security impact of the command to adjust the device of the property. In some examples, the security impact of the unauthenticated command may be determined by the device referenced by the command. For example, an unauthenticated command to adjust a thermostat, lights, blinds or a sprinkler system may be determined to have a low security impact, whereas an unauthenticated command to adjust the status of the monitoring system (e.g., arm or disarm) or door locks may be determined to have a high security impact. In some cases, the security impact of the command may depend on the action commanded. For example, an unauthenticated command to raise the security level of the property (e.g., to arm the monitoring system or lock the doors) may have a lower security impact than an unauthenticated command to lower the security level of the property (e.g., to disarm the monitoring system or unlock the doors).

Based on analyzing the property state information, the security impact of the command, and the command to adjust the device against the one or more rules, the monitoring control unit may generate an authorization request to adjust the device and provide that request to a computing device of a resident of the property. If the monitoring control unit receives from the computing device authorization to adjust the device of the property, the control unit may adjust the device according to the input command. In some implementations, the command to adjust the device may be received locally at the device while the property state information indicates that the resident of the property is outside of the property. Here, the monitoring control unit may generate an authorization request to adjust the device of the property and provide the request to the computing device of the resident.

In some implementations, the monitoring control unit may receive additional data collected by the sensors during a period of time before receiving the input command. Based on the additional data, the monitoring control unit may determine an activity pattern of persons in the property and update the property state information based on the activity pattern. The monitoring control unit may then analyze the updated property state information and the input command against the one or more rules and, based on the analysis, determine whether to perform the action corresponding to the input command or to perform another action that is different than the action corresponding to the input command.

In some implementations, the monitoring control unit may be configured to determine the energy consumption of the property and conditions in or near a property, where those conditions may include weather, daylight level, air quality, and other environmental conditions. Based on the energy consumption of the property, at least one user-specified setting, and the conditions, the monitoring control unit may generate the one or more rules related to authorizing unauthenticated input commands.

In some implementations, the property state information may indicate that a resident is leaving the property and the input command is a voice command uttered by the resident. Here, the monitoring control unit may determine that the resident is an authorized user and that the voice command is authorized. As a result, the monitoring control unit may perform the actions corresponding to the input command by performing one or more of: arming the monitoring system, deactivating one or more lights of the property, locking one or more doors of the property, and adjusting a thermostat of the property.

In some implementations, the property state information may indicate that a resident is arriving at the property and the input command is a voice command uttered by the resident. Here, the monitoring control unit may determine that the resident is an authorized user and that the voice command is authorized. As a result, the monitoring control unit may perform the actions corresponding to the input command by performing one or more of: disarming the monitoring system, activating one or more lights of the property, opening one or more doors of the property, adjusting a thermostat of the property, and activating an applicant located in the property.

Implementations of the described techniques may include hardware, a method or process implemented at least partially in hardware, or a computer-readable storage medium encoded with executable instructions that, when executed by a processor, perform operations. The details of one or more implementations are set forth in the accompanying drawings and the description below. Other features will be apparent from the description and drawings, and from the claims.

DESCRIPTION OF DRAWINGS

FIGS. 4A-4F illustrate example scenes that are integrated with monitoring systems.

DETAILED DESCRIPTION

Techniques are described for taking action in a monitoring system based on commands provided without authentication information. For example, commands provided without authentication information may enable seamless integration of scenes, or various configurations of home automation or settings of systems within the home, and/or actions, with monitoring systems. A system uses sensor data collected from a monitoring system of a property, including motion sensor data, microphones, cameras, network connectivity data, etc., to determine the current state of the home. In some implementations, based on the determined current state of the home, the monitoring system may take action based on commands provided without authentication information.

Figure 1:
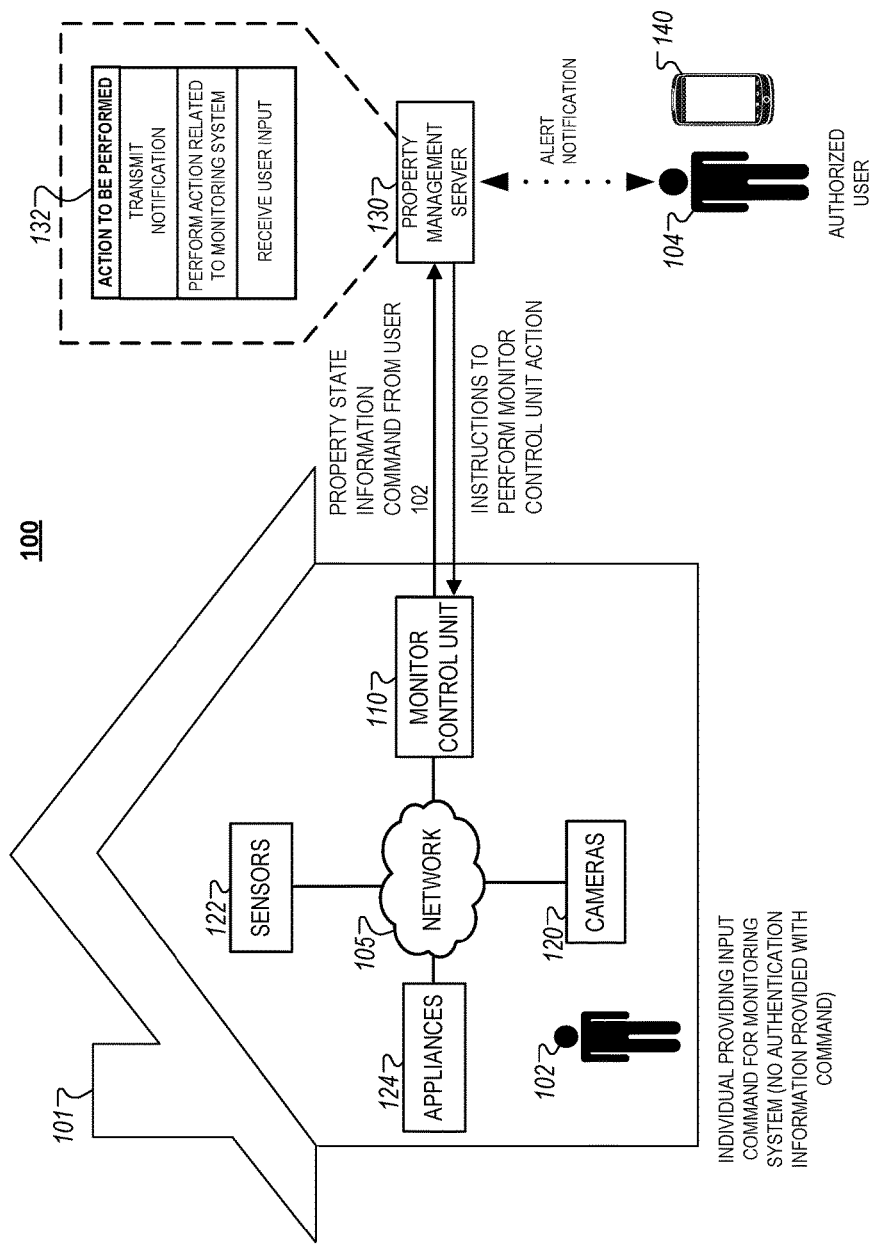
FIGS. 1-2 illustrate example systems that integrate scenes in a monitoring system using detection of authorized user presence and unauthenticated commands.

FIG. 1 illustrates a diagram of an example of an integrated system 100 associated with a property 101. In some examples, the system can be used to control systems and appliances of the property 101 based on the state of the property 101. While the following description is drafted in the context of a home, it is understood that the disclosure can be directed to various types of property, such as office buildings, public buildings, etc. Additionally, while the following disclosure is directed to a monitoring system that controls devices communicably coupled to the monitoring system, it is understood that the disclosure can be directed to monitoring systems or security systems that do not control devices communicably coupled to the monitoring system. For example, the disclosure may be applicable to monitoring systems that include sensors and cameras and do not include controllable heating, ventilation and air conditioning (HVAC) units.

In some examples, the system 100 validates homeowner presence before allowing commands with which no authentication information was provided to a monitoring system. The system 100 can integrate a state of the property 101 into home monitoring and automation by allowing, for example, simple commands or voice commands to be provided with reduced or no authentication based on the state of the property 101.

The property 101 may include various monitoring devices. For example, the property 101 may include cameras, sensors, and other devices that provide monitoring data associated with devices and areas of the property 101. Cameras located on the property 101 may provide video, still images, or other monitoring data, and may provide data via a live feed, transmit data to be stored in a remote location, store data locally for review at a later time, etc. Sensors located on the property 101 may include motion sensors, heat sensors, pressure sensors, resistive sensors, etc. Sensors may communicate with the monitoring control unit 110 and transmit monitoring data for processing to the monitoring control unit 110. In some examples, sensors located on the property 101 may store collected data locally or transmit monitoring data to be stored in a remote location.

The system 100 may include a monitoring control unit 110, one or more cameras 120, one or more sensors 122, one or more appliances 124, a property management server 130 that manages monitoring system data received from the monitoring control unit, and an authorized user device 140. The server 130 may maintain data that defines which users are authorized users 104, which devices are authorized user devices 140, and what actions related to a monitoring system of the property 101 to take based on received data. An individual may provide an input command for the monitoring system with which no authentication information was included 102. In some examples, the individual 102 is not the same as the authorized user 104, and is unauthorized. In some examples, the individual 102 is the same as the authorized user 104, and has not provided authentication information.

The monitoring control unit 110 includes a controller and a network module. The controller is configured to control a monitoring system (e.g., a home alarm or security system)

that includes the monitoring control unit 110. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the monitoring control unit 110.

The network module is a communication device configured to exchange communications over a network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module may also be a wired communication module configured to exchange communications over the network 105 using a wired connection. For instance, the network module may be a modem, a network interface card, or another type of network interface device. The network module may be an Ethernet network card configured to enable the monitoring control unit 110 to communicate over a local area network and/or the Internet. The network module also may be a voice-band modem configured to enable the alarm panel to communicate over the telephone lines of Plain Old Telephone Systems (POTS).

In some examples, the monitoring control unit 110 may include data capture and recording devices. In these examples, the monitoring control unit 110 may include the cameras 120, one or more motion sensors, one or more microphones, one or more biometric data collection tools, one or more temperature sensors, one or more humidity sensors, one or more air flow sensors, and/or any other types of sensors that may be useful in capturing monitoring data related to the property 101 and users in the property.

The monitoring control unit 110 may be configured to communicate with the cameras 120, the sensors 122, the appliances 124, and other devices and systems of the property 101 through a network 105. In some examples, the monitoring control unit 110 may communicate with the cameras 120, the sensors 122, the appliances 124, and other devices and systems of the property 101 directly. For example, the monitoring control unit 110 may directly receive data from the sensors 122, send control signals to the appliances 124, etc. The monitoring control unit 110 may be configured to communicate with the server 130. In some examples, the monitoring control unit 110 may be configured to communicate with the server 130 through the network 105. In some examples, the monitoring control unit 110 may be configured to communicate with the server 130 directly.

The monitoring control unit 110 also may include a communication module that enables the monitoring control unit 110 to communicate other devices of the system 100. The communication module may be a wireless communication module that allows the monitoring control unit 110 to communicate wirelessly. For instance, the communication module may be a Wi-Fi module that enables the monitoring control unit 110 to communicate over a local wireless network at the property 101. The communication module further may be a 900 MHz wireless communication module that enables the monitoring control unit 110 to communicate directly with a monitoring control unit. Other types of short-range wireless communication protocols, such as Bluetooth, Bluetooth LE, Z-Wave, ZigBee, etc., may be used to allow the monitoring control unit 110 to communicate with other devices in the property 101.

The monitoring control unit 110 further may include processor and storage capabilities. The monitoring control unit 110 may include any suitable processing devices that enable the monitoring control unit 110 to operate applications and perform the actions described throughout this disclosure. In addition, the monitoring control unit 110 may include solid state electronic storage that enables the monitoring control unit 110 to store applications, configuration data, collected sensor data, and/or any other type of information available to the monitoring control unit 110.

The monitoring control unit 110 may exchange communications with the sensors 122, the appliances 124, the cameras 120, and the property management server 130 using multiple communication links. The multiple communication links may be a wired or wireless data pathway configured to transmit signals from sensors 122, the appliances 124, the cameras 120, and the property management server 130 to the controller. The sensors 122, the appliances 124, the cameras 120, and the property management server 130 may continuously transmit sensed values to the controller, periodically transmit sensed values to the monitoring control unit 110, or transmit sensed values to the monitoring control unit 110 in response to a change in a sensed value.

The multiple communication links may include a local network. The sensors 122, the appliances 124, the cameras 120, and the property management server 130 and the monitoring control unit 110 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

In some implementations, the monitoring control unit 110 may additionally be used to perform routine surveillance operations on a property. For instance, the monitoring control unit 110 may be assigned to one or more particular properties within a geographic location and may routinely collect surveillance footage during specified time periods (e.g., after dark), which may then be transmitted to the property management server 130 for transmitting back to each particular property owner. In such implementations, the property owner may receive the surveillance footage over the network 105 as a part of a service provided by a security provider that operates the property management server 130. For example, transmissions of the surveillance footage collected by the monitoring control unit 110 may be part of a premium security service package provided by a security provider in addition to the routine drone emergency response service.

In some implementations, the monitoring control unit 110 may monitor the operation of the electronic devices of the system 100 such as sensors 122, the appliances 124, the cameras 120, and the property management server 130. For instance, the monitoring control unit 110 may enable or disable the devices of the system 100 based on a set of rules associated with energy consumption, user-specified settings, and/or other information associated with the conditions near or within the property 101 where the system 100 is located. In some examples, the monitoring control unit 110 may be used as a replacement to a traditional security panel (or monitoring control unit) that is used to monitor and control the operations of the system 100. In other examples, the monitoring control unit 110 may coordinate monitoring operations with a separate security panel of the system 100. In such examples, the monitoring control unit 110 may monitor particular activities of the devices of the system 100 that are not monitored by the security panel, or monitor the operation of particular devices that are not monitoring by the security panel.

In some examples, a monitoring system may not be used. In these examples, the systems and devices within the property 101 (e.g., the cameras 120, the sensors 122, the appliances 124, etc.) communicate directly with the server 130 over a long-range communication protocol.

The network 105 is configured to enable exchange of electronic communications between devices connected to the network 105. For example, the network 105 may be configured to enable exchange of electronic communications between the monitoring control unit 110, the sensors 122, the appliances 124, the cameras 120, and the property management server 130. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The system 100 includes one or more cameras 120. In some examples, the cameras 120 are part of the monitoring system for the property 101. The cameras 120 may be video/photographic cameras or other type of optical sensing devices configured to capture images. For instance, the cameras 120 may be configured to capture images of an area within a building monitored by the monitoring control unit 110. The cameras 120 may be configured to capture single, static images of the area and also video images of the area in which multiple images of the area are captured at a relatively high frequency (e.g., thirty images per second). The cameras 120 may be controlled based on commands received from the monitoring control unit 110.

The cameras 120 may be triggered by several different types of techniques. For instance, a Passive Infra Red (PIR) motion sensor may be built into the cameras 120 and used to trigger the cameras 120 to capture one or more images when motion is detected. The cameras 120 also may include a microwave motion sensor built into the camera and used to trigger the cameras 120 to capture one or more images when motion is detected. The cameras 120 may have a "normally open" or "normally closed" digital input that can trigger capture of one or more images when external sensors (e.g., the sensors 122, PIR, door/window, etc.) detect motion or other events. In some implementations, the cameras 120 receives a command to capture an image when external devices detect motion or another potential alarm event. The cameras 120 may receive the command from the controller or directly from one of the sensors 122.

In some examples, the cameras 120 trigger integrated or external illuminators (e.g., Infra Red, Z-wave controlled "white" lights, etc.) to improve image quality when the image is dark. An integrated or separate light sensor may be used to determine if illumination is desired and may result in increased image quality.

The cameras 120 may be programmed with any combination of time/day schedules, system "arming state", or other variables to determine whether images should be captured or not when triggers occur. The cameras 120 may enter a low-power mode when not capturing images. In this case, the cameras 120 may wake periodically to check for inbound messages from the controller. The cameras 120 may be powered by internal, replaceable batteries if located remotely from the monitoring control unit 110. The cameras 120 may employ a small solar cell to recharge the battery when light is available. Alternatively, the cameras 120 may be powered by the monitoring control unit 110's power supply if the cameras 120 is co-located with the controller.

In some implementations, the cameras 120 communicates directly with the property management server 130 over the Internet. In these implementations, image data captured by the cameras 120 does not pass through the monitoring control unit 110 and the cameras 120 receives commands related to operation from the property management server 130.

The system 100 also includes one or more sensors or detectors. For example, the monitoring system may include multiple sensors 122. The sensors 122 may include a contact sensor, a motion sensor, a glass break sensor, or any other type of sensor included in an alarm system or security system. The sensors 122 also may include an environmental sensor, such as a temperature sensor, a water sensor, a rain sensor, a wind sensor, a light sensor, a smoke detector, a carbon monoxide detector, an air quality sensor, etc. The sensors 122 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 122 may include a radio-frequency identification (RFID) sensor that identifies a particular article that includes a pre-assigned RFID tag.

The authorized device 140 can include a native surveillance application. In some examples, the native surveillance application is associated with the monitoring system for the property 101. The native surveillance application may be a software/firmware program configured to run on various devices that enables the user interface and features described throughout. The authorized device 140 may load or install the native surveillance application based on data received over a network (e.g., the network 105) or data received from local media. The native surveillance application runs on mobile devices platforms. The native surveillance application also enables the authorized device 140 to receive and process image and sensor data from the monitoring system.

In some implementations, the authorized device 140 communicate with and receive monitoring system data from the monitoring control unit 110 using a communication link. For instance, the authorized device 140 may communicate with the monitoring control unit 110 using various local wireless protocols such as Wi-Fi, Bluetooth, Z-Wave, Zig-Bee, HomePlug (Ethernet over powerline), or wired protocols such as Ethernet and USB, to connect the authorized device 140 to local security and automation equipment. The authorized device 140 may connect locally to the monitoring system and sensors 122 and other devices. The local connection may improve the speed of status and control communications because communicating through a network, such as the Internet or the network 105 with a remote server (e.g., the property management server 130) may be significantly slower.

Although the authorized device 140 is shown as communicating with the property management server 130, the authorized device 140 may also communicate directly with the monitoring control unit 110, the cameras 120, the sensors 122, the appliances 124, and other devices controlled by the monitoring control unit 110 when the authorized device 140 is near the property 101. For example, the authorized device 140 may exchange communications with the devices of the system 100 over the network 105.

In some implementations, the authorized device 140 receives monitoring system data captured by the monitoring control unit 110 through the network 105. The authorized device 140 may receive the data from the monitoring control unit 110 through the network 105 or the property management server 130 may relay data received from the monitoring control unit 110 to the authorized device 140 through the network 105. In this regard, the property management server 130 may facilitate communication between the authorized device 140 and the monitoring system.

Although FIG. 1 illustrates one property for brevity, the server 130 may manage monitoring systems and monitoring control units for many more properties and/or structures. For example, the system 100 may include several monitoring systems each associated with a respective multiple, different properties and the server 130 may manage actions, users, and devices for each of the different properties. The multiple, different properties may be owned by the same entity. For example, a single person may own all of the properties. In some examples, the multiple, different properties may be operated by different entities (e.g., owned by different entities) with single entities operating groups of properties. For example, each property may be a rental property owned by a different person, and a single property management company may be managing all of the rental properties using the system. In some examples, the property 101 is a commercial or industrial property, such as a restaurant or a factory.

The appliances 124 may be home automation devices connected to the network 105 that are configured to exchange electronic communications with other devices of the system 100. The appliances 124 may include, for example, connected kitchen appliances, controllable light sources, safety and security devices, energy management devices, and/or other types of electronic devices capable of exchanging electronic communications over the network 105. In some examples, the appliances 124 may include kitchen appliances, such as stoves, ranges, exhaust fans, ovens, etc. In some instances, the appliances 124 may periodically transmit information and/or generated data to the monitoring control unit 110 such that the monitoring control unit 110 can automatically control the operation of the appliances 124 based on the exchanged communications. For example, the monitoring control unit 110 may operate one or more of the appliances 124 based on a fixed schedule specified by the user. In another example, the monitoring control unit 110 may enable or disable one or more of the appliances 124 based on received sensor data from the sensors 122.

The property management server 130 is an electronic device configured to provide monitoring services by exchanging electronic communications with the monitoring control unit 110 and the authorized device 140 over a network, such as the Internet, a LAN, etc. In some examples, the network is the network 105. For example, the property management server 130 may be configured to monitor events (e.g., events that are used to determine the state of the property 101) generated by the monitoring control unit 110. In this example, the property management server 130 may exchange electronic communications with the network module included in the monitoring control unit 110 to receive information regarding events (e.g., alarm events) detected by the monitoring control unit 110. The property management server 130 also may receive information regarding events from the authorized device 140.

In some implementations, the property management server 130 may route alarm data received from the network module or the authorized device 140 to a central alarm station server that is maintained by a third-party security provider. The alarm data can include captured video footage of the detected individual within a specific area of the property 101, which is processed by the third-party security provider to request emergency assistance to the property 101. For example, the alarm data can be transmitted to law enforcement to indicate a potential security breach within the property 101. In some instances, the alarm data can also include metadata identified by the monitoring control unit 110 within the captured video footage (e.g., gender of the individual, suspected identity of the individual, key physical attributes, etc.). In these examples, the alarm data can either be transmitted to law enforcement after requesting confirmation from the user, or automatically transmitted without intervention from the user.

The property management server 130 may store sensor and image data received from the monitoring control unit 110 and perform analysis of the sensor and image data. Based on the analysis, the property management server 130 may communicate with and control aspects of the monitoring control unit 110 or the authorized device 140.

The operations performed by the system 100 may enhance safety when using kitchen appliances. In some examples, the server 130 receives state information for the property 101. The state information may be used to determine a scene to be applied to the property 101 or an action or actions to be performed. For example, if it is night time and occupancy is detected in bedrooms of the house, but no motion is detected, the scene may be a "Good night" scene in which the owners of the property 101 are home, but are asleep. The server 130 may provide a web interface that enables users (e.g., residents of the property 101, monitoring system operators, authorized users, etc.) to manage alerts, notifications, and monitoring system actions (e.g., contacting emergency responders, controlling appliances 124 in the property 101, analyzing monitoring system data collected by the monitoring control unit 110, etc.). In these implementations, the server 130 further receives data related to settings for the monitoring system controlled by the monitoring control unit 110.

The server 130 may provide a web interface that enables a user to define operational settings for the property 101 (e.g., alert profiles, energy management profiles, thermostat profiles, rules related to use of the appliances 124, etc.). In some examples, the individual inputting a command for the monitoring system with which no authentication information is provided 102 may define and update settings for appliances, devices, and systems of the property 101. In some examples, the authorized user 104 may make changes to settings and profiles for appliances, devices, and systems of the property 101 through the authorized device 140.

In general, the system 100 can be configured to respond to a command with which no authentication information was provided and input by the user 102. For example, the individual 102 can input a command by pressing a button on a thermostat of the property 101 to change the temperature of the property 101.

The server 130 may include actions 132 available in response to commands with which no authentication information was provided and input by the user 102. For example, in response to data received from the monitoring control unit 110 indicating that the user 102 provided a voice command to open a garage door of the property 101, the server 130 may access the available actions 132 and determine that it is necessary to transmit an alert to the authorized device 140. In some examples, the server 130 may transmit the alert directly to the authorized device 140. In some examples, the server 130 may transmit instructions to the monitoring control unit 110 to send the alert to the authorized device 140. In some examples, the server 130 may transmit instructions to the monitoring control unit 110 to perform an action related to the monitoring system of the property 101. In some examples, the server 130 may transmit control signals directly to a system or device of the monitoring system.

In the example depicted in FIG. 1, the monitor control unit 110 receives property state information from the various appliances and systems within the property 101, such as the sensors 122, the appliances 124, the cameras 120, etc. The property state information may include data such as occupancy data, a state of the monitoring system of the property 101, image data from the cameras 120, etc., and can be used to determine various scenes for the property 101. For example, if it is day time and a security system of the property 101 is armed, the server 130 may determine that an "Away at work" scene should be applied to the property 101, and that actions 132 are determined based on the "Away at work" scene. The monitor control unit 110 then receives a command with which no authentication information was provided and input by the user 102.

In this particular example, the monitor control unit 110 may then analyze the property state information against rules for the "Away at work" scene related to the command input by the user 102. After analyzing the property state information, the server 130 accesses the available actions 132 to determine an appropriate action to be performed based on the "Away at work" scene. After determining an appropriate action to be performed, the property management server 130 transmits instructions to perform the action to be performed to the monitoring control unit 110, which then transmits corresponding signals to one or more of the cameras 120, sensors 122, or the appliances 124. In some instances, the action to be performed may include transmitting an event notification indicating the command input by the user 102 and other associated data to the authorized device 140 of the authorized user 104.

The server 130 may maintain a database that stores property state information (e.g., typical patterns of property usage data (e.g., appliance 124 usage data, occupancy data, thermostat usage data, etc.). In some examples, the server 130 or the monitoring control unit 110 maintains the property usage data. The server 130 may analyze the property usage data to provide alerts/reports based on both events related to the command input by the user 102 and property usage data. For example, the server 130 may monitor the cameras 120 of the property 101 to determine whether the user 102 is an authorized user.

The server 130 may communicate with the monitoring control unit 110 to control operations of devices and systems located on the property 101. For example, if the command input by the user 102 is to disarm the security system of the property 101, and the current state of the property 101 will allow disarming the security system without authentication, the monitor control unit 110 may disarm the security system.

The authorized device 140 may be an electronic device associated with a property owner or an occupant that exchange network communications over a network, such as the Internet or the network 105. For example, the authorized device 140 may be smartphones, tablets, personal computers (PCs), network-enabled media players, home entertainment systems, cloud storage devices, and other types of network devices. In some examples, the authorized device 140 may be a smart speaker or an electronic home assistant. The authorized device 140 may access a service made available by the property management server 130 on the network 105, such as a mobile application. The data generated by the authorized device 140 may include over the network 105, which may be monitored by the monitoring control unit 110.

The system 100 intelligently leverages the property state information and the monitoring control unit 110 to aid in security monitoring and property automation. For example, the monitoring control unit 110 may aid in investigating alarm events detected at the property 101 through an analysis of property state information against one or more rules related to the command input by the user 102. In this example, the property state information may indicate that it is night time and all authorized occupants of the property 101 are asleep, and that a window in the kitchen has been opened with no activity from inside the kitchen detected. The sensors 122 for that particular kitchen window may transmit the data to the monitoring control unit 110, which may then transmit the information to the server 130. The server 130 may use the available actions 132 to determine that the police department needs to be notified.

Examples of implementations of the system 100 can use various types of data captured devices within the property 101 (e.g., the cameras 120, the sensors 122, the appliances 124, etc.) to perform different actions based on the present conditions of the property 101. In some instances, the notifications transmitted by the server 130 may be based on the property state information of the property 101. For example, the server 130 may transmit a notification to all users and devices associated with the property 101 in response to data from the monitor control unit 110 indicating a button press to open the garage door when the security system is armed (e.g., no one is home, everyone is asleep, etc.), whereas the server 130 may transmit a notification only to an administrator user in response to property state data indicating a breach within the property 101 when the security system is unarmed. In other examples, the server 130 may transmit a high-priority alert for if the security status of the property 101 is set to an "Alarmed" mode. For example, if a pet in the property 101 has opened a door while owners of the property 101 are at work, the monitoring control unit 110 may receive data indicating the door open event, and may transmits the data to the server 130. The server 130 can transmit an image taken by a camera 120 within the property 101 along with a high-priority alert.

In some implementations, the property management server 130 can transmit instructions to the monitoring control unit 110 to adjust one or more settings associated with the devices within the property 101. For instance, in response to the door open event, the monitoring control unit 110 may receive instructions from the server 130 to close the door and send an alert to the owners of the property 101. In such instances, the particular instructions received by the monitoring control unit 110 can be varied based on the current state of the property 101. For example, John may prefer that the door be locked after it is closed, whereas Susan may simply want the door to be closed.

In some implementations, where the property management server 130 transmits notifications to the authorized device 140, the particular notification transmitted can be based on the location of the authorized device 140. For example, a notification can be prevented from being transmitted if the authorized device 140 is near or with the property 101. In other examples, the property management server 130 can transmit notifications to another remote user if the authorized device 140 is located within the property 101.

In some implementations, the server 130 determines the particular action to be performed in response to a command input by the user 102 based on monitoring one or more parameters indicated by the data transmitted from the monitoring control unit 110. For instance, as described more particularly with respect to FIGS. 2-4, the available actions 132 can specify different actions to be performed based on the current state of the property 101 and at least one of: occupancy information gathered by the devices within the property 101, the security status indicated by a security system of the property 101, etc. In some implementations, the available actions 132 are defined by a scene applied to the property 101. In some implementations, the available actions 132 are defined by the server 130. More particular descriptions related to the components of the system 100 are provided below.

Figure 2:
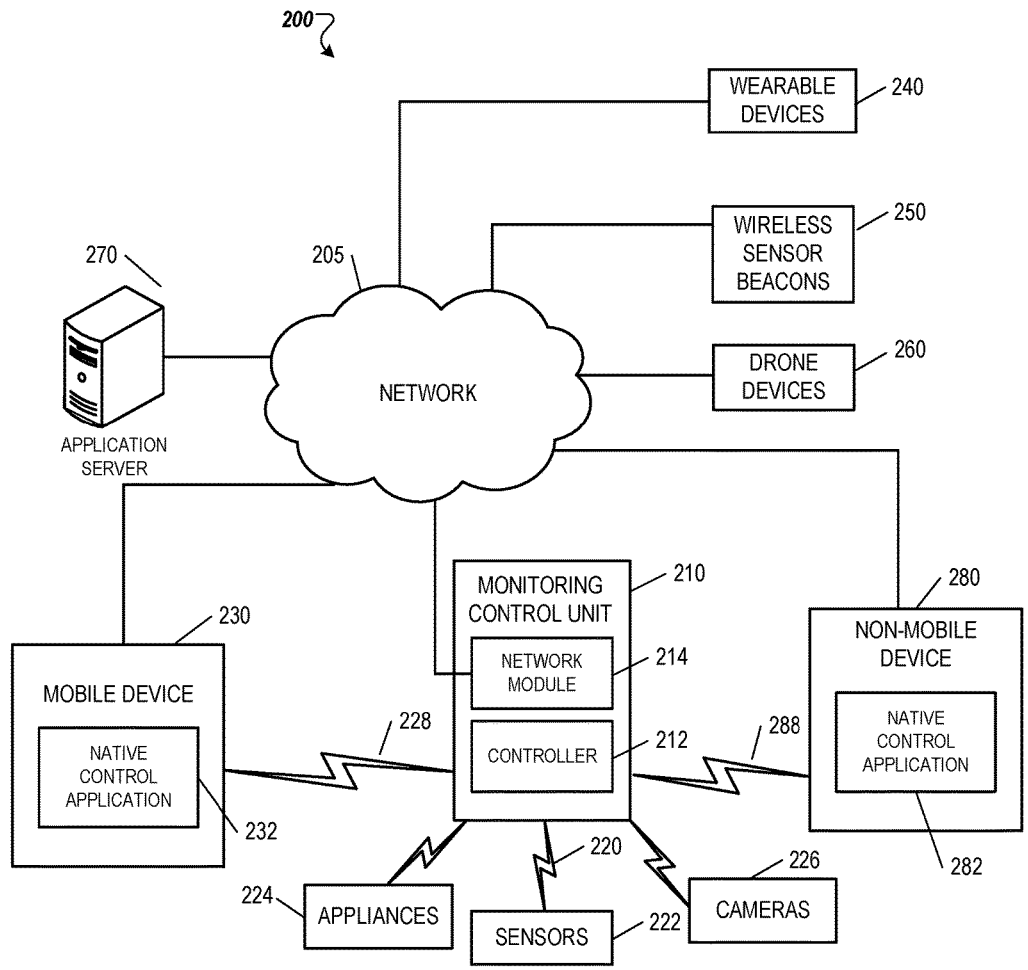

FIG. 2 illustrates a diagram of an example of an integrated system 200. In some examples, the system 200 is an example of the system 100. The system 200 may include a network 205, a monitoring control unit 210, one or more sensors 222, one or more mobile devices 230, one or more wearable devices 240, one or more beacons 250, one or more drone devices 260, an application server 270, and one or more non-mobile devices 280. The network 205 may be configured to enable electronic communications between devices connected to the network 205. For example, the network 205 may be configured to enable exchange of electronic communications between the monitoring control unit 210, the sensors 222, the appliances 224, the cameras 226, the mobile device 230, the wearable devices 240, the beacons 250, the drone devices 260, the application server 270, and the non-mobile device 280. The network 205 may be similar to the network 105 described with respect to FIG. 1.

The monitoring control unit 210 may include a controller 212 and a network module 214. The controller 212 may be similar to the controller of the monitoring control unit 110 as described with respect to FIG. 1. The network module 214 may be similar to the network module of the monitoring control unit 110 as described with respect to FIG. 1.

The sensors 222 may be similar to the sensors 122 as described with respect to FIG. 1. The sensors 222 may include cameras, pressure sensors, temperature sensors, motion sensors, occupancy sensors, or device sensors that may communicate with the monitoring control unit 210 over the communication link 220. For example, the sensors 222 may provide the monitoring control unit 210 sensor data indicating when users left a home, when users arrived home, what users are home, what users were doing before they left the home and an appearance of users when they left the home.

In other implementations, the sensors 222 may include motion sensors, pressure sensors, or other sensors that determine occupancy and usage of appliances/features within the property. For example, in one instance, motion and temperature sensors may be placed on the walls within a room to determine if a person is currently occupying or not occupying the room. In another instance, the sensors 222 may be placed on particular objects and/or appliances to monitor user activity and user safety within a property. For example, touch sensors may be placed on common appliances such as, for e.g., an oven, a stove, a blender, a space heater, which may cause personal injuries to users. In some implementations, the sensors 222 within the property may collect user activity data based on proximity with the wearable devices 240 to track user movement within the property. In another example, the sensors 222 may only collect user activity data when the user is located within property based on location data transmitted from the wearable devices 240 indicating that the user is within a particular distance (e.g., 5 meters) from the sensors 222.

The one or more mobile devices 230 may be devices that host one or more native applications, e.g., the native control application 232. The mobile devices 230 may be similar to the authorized device 140 as described with respect to FIG. 1. The mobile devices 230 may be cellular phones or non-cellular locally networked devices. The mobile devices 230 may include a cell phone, a smart phone, a tablet PC, a personal digital assistant ("PDA"), or any other portable device configured to communicate over a network. For example, implementations also may include portable music players, other communication devices, and handheld or portable electronic devices for gaming, communications, and/or data organization. The mobile devices 230 may be the same or may include mobile devices of different types. The mobile devices 230 may perform functions unrelated to the monitoring platform 200, such as placing personal telephone calls, playing music, playing video, displaying pictures, browsing the Internet, maintaining an electronic calendar, etc.

The one or more non-mobile devices 280 may be devices that host one or more native applications, e.g., the native control application 282. The non-mobile devices 280 may be laptop computers, desktop computers, speakers, voice-activated control systems, wired telephone systems, or any other non-mobile device configured to communicate over a network. For example, implementations also may include gaming systems, other communication devices, and non-mobile electronic devices for gaming, communications, and/or data organization. The non-mobile devices 280 may be the same or may include non-mobile devices of different types. The non-mobile devices 280 may perform functions unrelated to the monitoring platform 200, such as placing personal telephone calls, playing music, playing video, displaying pictures, browsing the Internet, maintaining an electronic calendar, etc.

In some implementations, the devices 230, 280 may communicate with and receive data from the monitoring control unit 210 using the communication links 228, 288. For instance, the devices 230, 280 may communicate with the monitoring control unit 210 using various local wireless protocols, such as Wi-Fi, Bluetooth, Z-Wave, ZigBee, HomePlug (Ethernet over power line), or wired protocols such as Ethernet, USB, and other wired protocols based on the RS232, RS485, and/or RS422 standards. The devices 230, 280 may connect locally to the monitoring platform 200, its sensors, and other devices. The local connection may improve the speed of communications because communicating through the network 205 with a remote server, e.g., the application server 270, may be slower.

Although the devices 230, 280 are shown communicating with the monitoring control unit 210, the devices 230, 280 may communicate directly with the sensors 222, the appliances 224, the cameras 226, the wearable devices 240, the beacons 250, the drone devices 260, and other devices controlled by the monitoring control unit 210. In some implementations, t the devices 230, 280 may replace the monitoring control unit 210 and perform the functions of the monitoring control unit 210 for local control and long range or offsite communication.

In other implementations, the devices 230, 280 may receive data captured by the monitoring control unit 210 through the network 205. The devices 230, 280 may receive the data from the monitoring control unit 210 through the network 205 or the application server 270 and may relay data received from the monitoring control unit 210 to the devices 230, 280 through the network 205. In this regard, the application server 270 may facilitate communications between the devices 230, 280 and the monitoring control unit 210.

Although the devices 230, 280 are shown in FIG. 2 as being connected to the network 205, in some implementations, the devices 230, 280 are not connected to the network 205. In these implementations, the devices 230, 280 may communicate directly with one or more of the monitoring platform 200 components and no network connection, e.g., connection to the Internet, or reliance on remote servers is needed.

In some implementations, the devices 230, 280 may be able to determine a geographic location associated with the devices 230, 280, and may communicate information identifying a geographic location associated with the devices 230, 280 to the sensors 222 or the wearable devices 240. For example, the devices 230, 280 may determine the current geographic location of the devices 230, 280 by using global positioning system (GPS) capabilities. In other implementations, a geographic location associated with the devices 230, 280 may be determined using other methods, for example, by using Wi-Fi access point triangulation data, cellular network triangulation data, or IP address information, when the devices 230, 280 have network connectivity. The devices 230, 280 may additionally or alternatively transmit data identifying the geographic location of the devices 230, 280 over the network 205 to the application server 270, or to the monitoring control unit 210.

The devices 230, 280 may each include a native application 232, 282 respectively. The native applications 232, 282 refer to a software/firmware program running on the corresponding mobile devices that enables the safety monitoring features described within this disclosure. The devices 230, 280 may load or install the native applications 232, 282 based on data received over a network or data received from local media. The native monitoring applications 232, 282 may run on mobile devices' platforms, such as Apple iOS, iPhone, iPod touch, Blackberry, Google Android, Windows Mobile, etc.

The native applications 232, 282 identify and display user data such as, for e.g., a geographic location associated with the devices 230, 280 and communicate information identifying the geographic location to various devices within the monitoring platform 200 such the sensors 222, the wearable devices 240, or the monitoring control unit 210. In some instances, the native application 232 may also transmit user data to the application server 270. For example, the devices 230, 280 having the native applications 232, 282 may determine a geographic location of the devices 230, 280 using GPS capabilities, and may communicate data identifying the geographic location to the application server 270. In some instances, the native applications 232, 282 may check the location of the devices 230, 280 periodically and may automatically detect when a user associated with the devices 230, 280 is going toward or away from a property.

The wearable devices 240 may be portable electronic devices that may be incorporated into items of clothing and accessories worn by a user. The wearable devices 240 may be activity trackers, smartwatches, smart glasses, handhelds, bracelets, necklace pendants, or any wearable device configured to communicate over a network. The wearable devices 240 may include devices of different types. The wearable devices 240 may perform functions unrelated to the monitoring platform 200, such as monitoring user activity data such as, for e.g., biometric data, fitness data, sleep data, user-inputted data, and any other type of quantitative data.

In some implementations, the wearable devices 240 may include an integrated panic button that a user may push to have the wearable devices 240 transmit a distress signal indicating that the user requires emergency assistance to the application server 270 or an emergency responder, such as a 911 dispatch center.

In some implementations, the wearable devices 240 may include embedded sensors that measure various biometric data such as, for e.g., heart rate or rhythm, breathing rate, blood oxygen level, blood pressure, skin temperature, skin moisture. In some implementations, the wearable devices 240 may include hardware components such as an accelerometer, a gyroscope, a microphone, a camera, image sensors, video sensors, sound sensors, and/or an automated speech recognizer.

The wearable devices 240 may constantly monitor and process data transmitted between the components of the monitoring platform 200 such as, e.g., the monitoring control unit 210, the sensors 222, or the mobile devices 230.

In some implementations, the wearable devices 240 may function independently of the components of the monitoring platform 200 and include a separate network module that enables the wearable devices 240 to connect to the components of the monitoring platform 200 by exchanging wireless communications over the network 205. For instance, the wearable devices 240 may include one or more GSM modules, a radio modem, a cellular transmission mode, or any type of module configured to exchange communications in the following formats: LTE, GSM or GPRS, CDMA, EDGE, EGPRS, EV-DO or EVDO, UMTS, or IP. In other instances, the wearable devices may be capable of using various local wireless protocols, such as Wi-Fi, ANT, Bluetooth, Z-Wave, ZigBee, HomePlug (Ethernet over powerline), or wired protocols such as Ethernet, USB, and other wired protocols based on the RS232, RS485, and/or RS422 standards. For example, the wearable devices 240 may transmit measured data to the mobile devices 230 over a local wireless protocol and the mobile devices 230 may then transmit the data received by the wearable devices 240 to the application server 270.

The one or more wireless sensor beacons 250 can be devices capable of emitting and/or receiving information over a wireless communication channel. For example, the wireless sensor beacons 250 may utilize Bluetooth Low Energy (BLE), also known as Bluetooth Smart, or other wireless technologies such as, for e.g., Wi-Fi, near-field communications (NFC), or other wireless technologies, to communicate with the devices connected over the network 205. The wireless sensor beacons 250 may be commercially available beacon devices or other types of beacon devices. The wireless sensor beacons 250 may communicate with the devices of the monitoring platform 205 by emitting messages (e.g., pings) that include information identifying the wireless sensor beacons 250.

In some implementations, devices of the monitoring platform 200 such as the mobile devices 230, and the wearable devices 240 may communicate with the wireless sensor beacons 250 by receiving message from the one or more wireless sensor beacons 250 identifying one or more of the wireless sensor beacons 250. For example, each of the one or more wireless sensor beacons 250 may be associated with a unique universal identifier (UUID) that identifies a particular wireless sensor beacon within a group of two or more wireless sensor beacons within a particular geographic location, for e.g., a shopping complex.

In some implementations, a particular wireless sensor beacon 250 may be associated with particular regions within a geographic location, for e.g., particular floors or individual shops within a shopping complex, to monitor user data by exchanging communications with nearby one or more mobile devices 230, 280 or wearable devices 240. For example, one or more wireless sensor beacons 250 may be placed within multiple floors of a shopping complex, each with different UUIDs and a particular set of latitude and longitude coordinates that are associated with a defined region (e.g., a section within a store, an outdoor area, a building, a venue or other space).

Each of the one or more wireless sensor beacons 250 may broadcast information to allow the devices of the monitoring platform 200 to recognize the one or more of the wireless sensor beacons 250. In some instances, the one or more wireless sensor beacons 250 broadcast their information periodically for particular periods of time (e.g., every second, every millisecond). The one or more wireless sensor beacons 250 may broadcast this information using wireless communications protocols such as, for e.g., BLE. In some implementations, information broadcasted by the one or more wireless sensor beacons 250 may also be broadcasted on particular frequencies or power levels to control the types of devices on the monitoring platform 200 that receive the information. For example, the one or more wireless sensor beacons 250 may transmit information to the mobile devices 230 and the wearable devices 240, on different frequencies, respectively.

In some implementations, the one or more wireless sensor beacons 250 may be placed in common regions that experience high user traffic volumes such as, for e.g., a public park, a tourist attraction, a public transportation station, a commercial complex, or other types of highly populated locations. In such implementations, the one or more wireless sensor beacons 250 may be configured with third-party electronic transportation or safety platforms to transmit information to the devices connected to the monitoring platform 200. For example, the one or more wireless sensor beacons 250 may detect a hazardous condition on a subway line based on receiving safety signals from the transportation authority and in response, transmit this information to the mobile devices 230 or the wearable devices 240.

In some implementations, the one or more wireless sensor beacons 250 may be configured to operate with a particular mobile application that is installed on the devices connected to the monitoring platform 200. For example, the particular mobile application may include a software development kit (SDK) that enables the devices connected to the monitoring platform to exchange communications with the one or more wireless sensor beacons 250. For instance, the different devices connected to the monitoring platform 200 may independently exchange communications with the one or more wireless sensor beacons 250. In such instances, a wearable device 240 may be able to transmit a distress signal including user data to the one or more wireless sensor beacons without the user having his/her mobile device with him. In other instances, the one or more wireless beacons 250 may receive redundant signal transmissions from the different devices connected to the monitoring platform 200 to ensure that distress signal is adequately transmitted to the application server 270 when one or more of the devices connected to the monitoring platform 200 malfunctions. For example, if a user is involved in a car crash that destroys his/her wearable device and mobile device, the monitoring platform 200 may determine that these devices are unable to transmit the distress signal and instead transmit a distress signal including cached data stored on other devices connected to the monitoring platform 200 such as the one or more wireless sensor beacon 250 or the drone devices 260.

In some implementations, the one or more wireless sensor beacons 250 may be connected to emergency call booths that enable the one or more wireless sensor beacons 250 to identify devices within a particular distance (e.g., 30 meters) when the devices transmit a distress signal to the monitoring platform 200. For example, the emergency call booths may monitor a particular frequency that includes the frequency of the outgoing distress signals transmitted by nearby devices. In response to detecting that a nearby device has transmitted a distress signal within a particular time period (e.g., 5 minutes), the particular wireless sensor beacon 250 that is connected to the emergency call may then transmit a signal including location information to the application server 270 or to an emergency responder, such as a fire department dispatch center.

The drone devices 260 may be unmanned devices that are capable of movement. For example, the drone devices 260 may be capable of moving throughout a location based on automated control technology and/or user input control provided by either the user or by the devices connected to the monitoring platform 200. In this example, the drone devices 260 may be able to fly, roll, walk, or otherwise move about a location. The drone devices 260 may include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft).

In some implementations, the drone devices 260 may be dispatched in response to an incident signal indicating that a user may require emergency assistance. For example, if a user has been injured during a known running route, the wearable device 240 may transmit data to the application server 270 from which the application server 270 may determine there is a likely safety incident, and in response, transmit an incident signal and a location of the user to an emergency responder and also transmit a dispatch instruction with the user location to the drone devices 260. The application server 270 may determine the location of the user during an incident based on comparing current data collected by the sensors 222, one or more mobile devices 230, 280, the wearable device 240, or the one or more wireless sensor beacons 250 to historical information about the user or user activity. In such examples, the monitoring platform 200 may deploy the drone devices 260 to the determined location. In some instances, the drone devices 260 may be equipped with a broadband connection that allows the drone devices 260 to connect with the network 205.

In some implementations, the drone devices 260 may include data capture and recording devices. In some instance, the drone devices 260 may include one or more cameras, one or more motion sensors, one or more microphones, one or more biometric collection tools, one or more temperature sensors, one or more humidity sensors, one or more airflow sensors, and/or other types of sensors that may be useful in capturing monitoring data related to user safety. For example, once dispatched to a location where the user may require emergency assistance, the drone devices 260 may capture a video feed of the user showing the extent of injury and transmit the video feed to either the application server 270 or directly to an emergency responder to alert them about the user's condition. In other examples, the drone devices 260 may be outfitted with thermal-imaging cameras capable of identifying locations, people, or pets through structural features of a location. For example, the drone devices 260 may be deployed to a property in which a user is located and may use the thermal-imaging cameras to determine a particular location within the property where the user may be trapped inside the property. In such examples, the drone devices 260 may transmit the captured thermal video footage to an emergency responder, such as a nearby fire station.

In some implementations, the drone devices 260 may also include output devices. In such implementations, the drone devices 260 may include one or more displays, one or more speakers, one or more projectors, and/or any type of output devices that allow the drone devices 260 to communicate information to nearby emergency contacts. For example, if a user is physically disabled as the result of an incident and unable to use wearable devices 240 or mobile devices, the user may record a distress message or video using the drone devices 260, which may then transmit the message or video to the application server 270.

In some implementations, the drone devices 260 may be configured to record visual verifications and/or identify perpetrator identification for particular types of incidents. For example, in response to safety incidents determined by the application server 270, the application server 270 may deploy the drone devices 260 to record video footage. In some instances, the drone devices 260 may be configured to operate within certain geographic regions (e.g., a gated residential community). The drone devices 260 may be centrally operated by a security provider such as an alarm security company providing security services to a particular geographic region. In such instances, the drone devices 260 may be stored in a central home base with a charging and control station and deployed as a mobile solution in response to an incident signals for users.

In some implementations, the drone devices 260 may be delivery drones (e.g., a parcelcopter) that may be utilized by the monitoring platform 200 to provide supplies or other equipment to a user in response to the application server 270 detecting the occurrence of an incident. For instance, the drone devices 260 that are delivery drones may be used to dispatch first aid kits and/or other emergency medical equipment (e.g., gauze, bandages, braces, epi pens, tourniquets, etc.). In such instances, the drone devices 260 may delivery particular supplies based on the classification of the incident by the application server 270.

In some implementations, after the application server 270 determines an incident, the application server 270 may select the particular drone device 260 to deploy to the incident from a set of drone devices 260 based on particular attributes such as, for e.g., charge levels, location of the incident, and the direction of user movement. For example, the set of drone devices 260 may include various drone devices 260 with varying battery capacities, aerial speeds, and/or device features. In such examples, the monitoring platform 200 may choose the particular drone device 260 to be deployed that can get to the location of the incident the fastest and has enough battery to monitor the user for a reasonable amount of time (e.g., fifteen minutes).

In some implementations, multiple drone devices from the set of drone devices 260 may be deployed based on the particular nature of the safety incident. For example, the application server 270 may deploy multiple drone devices if the received user data indicates the safety incident is a life-critical incident (e.g., a house fire) that causes a loss of life. In some instances, the multiple drone devices may be deployed sequentially to maximize response time and conserve resources. For example, the multiple drones may include a diagnostic drone device, which is deployed initially to minimize response time, and a support drone device that provide the user with emergency supplies to help with the emergency event. In another example, an initial drone device may be deployed to minimize response time while a secondary drone is deployed as a backup if the battery of the initial drone runs out.

The application server 270 may be an electronic device configured to process data from the monitoring control unit 210. In some examples, the application server 270 is similar to the property management server 130 as described with respect to FIG. 1. For example, the application server 270 may determine from received sensor data whether the user is injured or in danger. To make the determination, the application server 270 may provide control services by exchanging electronic communications with the monitoring control unit 210 and the mobile devices 230 over the network 205. For example, the application server 270 may be configured to monitor user data generated by the devices connected to the monitoring platform 200 such as the sensors 222, the devices 230, 280, the wearable devices 240, the one or more wireless sensor beacons 250, and the drone devices 260. In this example, the application server 270 may exchange electronic communications over the network 205 to send and/or receive information regarding user activity such as biometric data, activity data, location data and health data. The application server 270 also may receive information regarding activity within or external to the property from the devices 230, 280 or the wearable devices 240.

In some implementations, the application server 270 may store a user profile with user data transmitted from the devices connected to the monitoring platform 200. For instance, the devices connected to the monitoring platform 200 may periodically transmit various types of user data to the application server 270. The application server 270 may aggregate the different types of user data such as personal data, biometric data, activity data, and historical data into a user profile. In some instances, the application server 270 may use the user profile to learn normal usage patterns such as activity patterns (e.g., common exercise routines) and normal biometric measurements (e.g., resting heart rate, baseline blood pressure, normal skin temperature, baseline breathing rate). For example, the application server 270 may periodically receive user data collected by the devices connected to the monitoring platform 200 such as, for e.g., the devices 230, 280, or the wearable devices 240, and log the user data into the user profile. The application server 270 may then aggregate the received user data over particular time periods (e.g., six months) and perform trend analyses to determine normal biometric measurements for the user. In another example, the application server 270 may receive user activity data (e.g., steps taken, calories burnt) and compare the activity data with location data to determine usage patterns such as exercise locations, exercise routines, and other activity patterns.

In some implementations, the application server 270 may determine incidents and generate incident reports indicating that a user requires emergency assistance. For example, an incident may be any type of safety incident that is detected by the application server 270 based on the user data collected by the devices of the monitoring platform 200. For example, the application server 270 may determine that a user may be having a heart attack based on the particular wearable device 240 that measures heart rate data that the current heart rate is too high compared to a reference measurement. In response, the application server 270 may transmit an incident report to an emergency responder, such as an ambulance dispatch center, that includes various types of user data such as, for e.g., heart rate measurements, user activity data indicating prior physical activity, historical measurements of heart rates hours prior to the incident.

In another example, the application server 270 may determine from received sensor data that a user was running along a trip route saved in a user's profile and mid-way between the route, the user's breathing pattern and heart rate corresponded to those when the user is unconscious or asleep and that the user is still moving. In response, the application server 270 may determine that there is a safety issue. For example, the application server 270 may determine from data from cameras 226 that the user may have been kidnapped. If the application server's 270 confidence that the user has been kidnapped is high, the application server 270 may immediately notify emergency personnel. If the application server's 270 confidence that the user has been kidnapped is moderate, the application server 270 may display a prompt and an audio alert on the user's mobile device, wearable device or heads up display indicating that the application server 270 has determined that the user may be in danger and how the application server 270 made the determination, and a countdown indicating that emergency personnel will be notified if the user does not verify that there is no safety issue within a specific period of time (e.g., thirty seconds). The application server 270 may require that the user enter a passcode on the user's mobile device to verify that no notification should be made.

In some instances, the application server 270 may be configured to determine particular duress codes sent by the user in the event of an emergency incident. For instance, the user may enter a pre-determined or customized duress code it appears as if the user has cancelled the alarm but actually transmits a duress signal to the application server 270. For example, the user may enter the duress code during a robbery.

In yet another example, the application server 270 may receive an indication that a user has activated a panic button on a necklace worn by the user, sensor data indicating that the user was traveling at a high speed corresponding to a car and is no longer moving, and sensor data indicating that the user's car airbags have deployed. In response, the application server 270 may determine that the user has been in a car accident and is seriously injured and may notify emergency personnel accordingly.

In some instances, the application server 270 may monitor the user location of the user when he/she is close to or inside the property to determine how to process an incident signal. For example, if the user is involved in an incident outside the property, the application server 270 may transmit the incident signal to emergency responders and if the user is involved in an incident inside the property, the application server 270 may instruct the monitoring control unit 210 to transmit the incident signal to the home security provider for the home.

In some implementations, the application server 270 may determine the occurrence of an incident based on comparing extrinsic data surrounding the user location and the user data collected by the devices connected to the monitoring platform 200. For instance, the application server 270 may monitor current weather, daylight level, air quality, and/or other external conditions to determine whether the user data indicates suspicious conditions. For example, if the current weather indicates a thunderstorm, then the application server 270 may determine that the user location indicating that the user is stationary outside may be suspicious, e.g., the user may have been struck by lightning or the user is being forced to stay stationary outside. In another example, if it is night time, the application server 270 may determine that the user is more likely to be performing night time activities, e.g., stargazing, walking, jogging as opposed to football or basketball, and determine whether there is likely to be a safety incident based on the types of night time activities in which the user might have been engaged. In yet another example, if it is night time but the user data indicates that the user is currently performing activities outside that are better suited for sunlight, e.g., football or basketball, the monitoring platform 200 may also determine that this may be suspicious. In another example, if the user medical history in the application server 270 indicates that the user may have asthma but that the user is located in an area with low air quality, the application server 270 may predict that the user may likely have an asthma attack or may determine that the user is likely suffering an asthma attack.

In some implementations, the application server 270 may aggregate user data collected by devices of multiple users that are all connected to the monitoring platform 200 to gather data surrounding mass casualty incidents. For example, if there is a large-scale emergency within a particular location (e.g., earthquake, terror attack, public evacuation, etc.), the application server 270 may determine the presence of such an emergency based on aggregating suspicious data from multiple devices within the particular location. The application server 270 may compare the aggregated data to other types of environmental data (e.g., seismic activity, electromagnetic pulses, or radiation) that are be collected from sensors located nearby or within the particular location where there may be abnormal activity.

In some implementations, the monitoring platform 200 may additionally or alternatively include various features.

For example, the monitoring platform 200 may include a peer-to-peer location sharing feature that enables users to send location information collected from the mobile devices 230 or the wearable devices 240 to emergency contacts. In another example, the monitoring platform 200 may include a distress signal forwarding feature that enables a user to transmit a distress signal including user location information from either the mobile devices 230 or the wearable devices 240 to an emergency responder such as, for example, a fire station, an emergency medical services facility, or a police station. In another example, the monitoring platform 200 may include mobile applications that use the location data collected by the devices 230, 280 and the wearable devices 240 to determine the nearby authorities having jurisdiction (AHJ) or the public safety access points (PSAP) in case of an emergency incident within the user location.

The monitoring platform 200 as described within this disclosure may be adapted to function with a variety of wearable devices, communication devices, and networks with long-term extensibility. For example, new wearable devices and applications may be adapted to operate with the monitoring platform 200 by adapting the new wearable devices to run mobile applications that are capable of exchanging communications with the devices connected to the monitoring platform 200. In some instances, the monitoring platform 200 may include a mobile application ecosystem that includes customized mobile applications that are built for particular mobile devices, wearable devices, communication devices, safety sensors, drone devices, and wireless sensor beacons such that these devices may exchange communications over the network 205 with emergency responders. For instance, particular examples of wearables device may include a smart motorcycle helmet or a smart skiing helmet that can transmit speed and crash information to emergency medical responders, including the location on the helmet of the impact(s) and the number of impacts(s). In another instance, vehicles such as cars, motorcycles, and public transportation may include smart sensors that transmit distress signals to nearby emergency responders in response to a vehicular crash. In other instances, wearable devices may include miniaturized personal health devices used to monitor the movement of patients with chronic diseases such as, for e.g., Parkinson's disease.

Figure 3A:
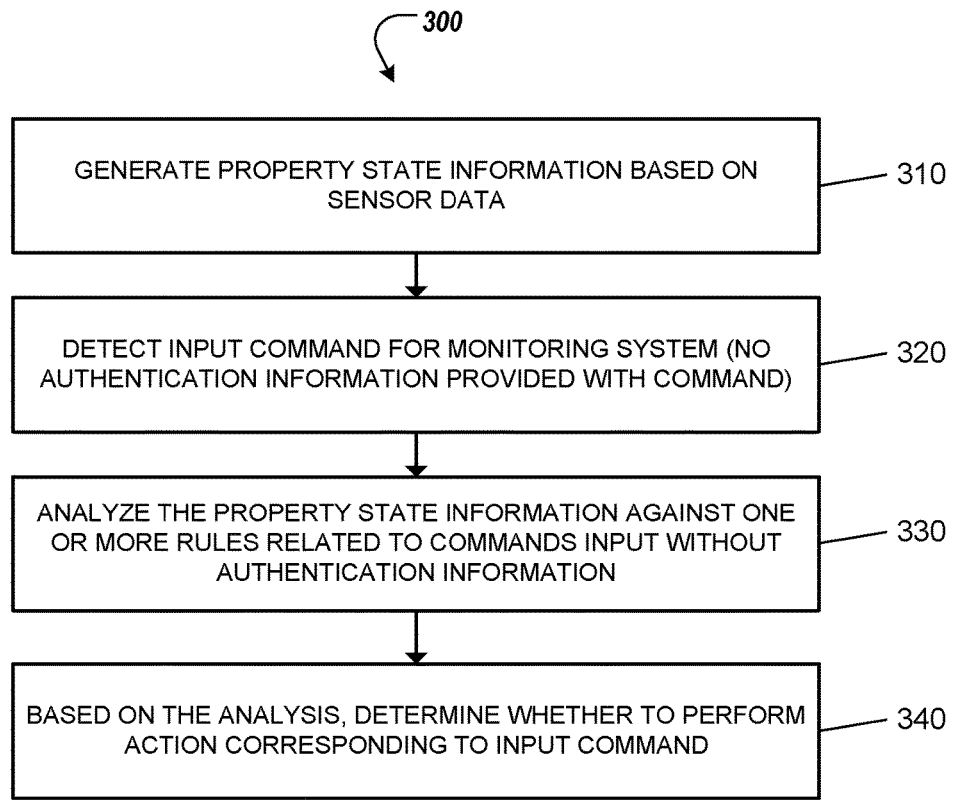
FIGS. 3A-3B are flow charts of example processes of taking action in a monitoring system based on commands provided without authentication information.

FIG. 3A illustrates an example of a process 300 of taking action related to a monitoring system based on commands provided without authentication information. Briefly, the process 300 may include generating property state information based on sensor data (310), detecting input of a command for the monitoring system with which no authentication information was provided (320), analyzing the property state information against one or more rules related to commands input without authentication information (330), and based on the analysis, determining whether to perform the action corresponding to the input command or whether to take another action that is different than the action corresponding to the input command.(340).

In more detail, the process 300 includes generating property state information based on sensor data (310). In some examples, the systems 100 and 200 can perform the process 300. For example, the property management server 130 can receive sensor information from the appliances 124. In some examples, the server 130 can receive the data through the monitoring control unit 110. Based on the received sensor information, the server 130 can generate property state information, such as movement in a particular area of the property, occupancy of the property, identification of activity patterns of the occupants of the property, or other property state information.

The server 130 can receive various types of data through the monitoring control unit 110. The server 130 may receive data from the sensors 122, the appliances 124, the cameras 120, etc., that indicate an occupancy of the property 101. For example, the server 130 may receive data from the sensors 122 indicating motion data within the property 101. In some examples, the server 130 may receive motion data from a bedroom, then the hallway, then stairs, then the kitchen. In some examples, the server 130 may analyze or process motion data received to detect an activity pattern. In the above example, the server 130 may determine that the motion data indicates that a person within the property 101 is waking up, and is heading to the kitchen to make coffee.

In some examples, the server 130 may receive audio data that is analyzed for an activity pattern. For example, the server 130 may receive audio data that indicates that a person is moving from the garage to the mud room and is heading down the hall to the restroom. In this example, the server 130 may use pattern detection and historical data to determine that the person is likely John, an owner of the property 101, who usually returns from work at the current time, and generally heads straight for the restroom after taking off his coat and hanging it up in the mud room.

The server 130 is able to detect occupancy through various data inputs. Data inputs used to determine occupancy may include various and multiple types of sensors 122, such as light sensors, infrared sensors, audio sensors, appliance-specific sensors (e.g., toilet flush, stove knob, TV on, etc.), cameras 120, etc. In some examples, the server 130 can combine data from the various and multiple types of sensors 122 to detect occupancy and/or activity patterns. For example, the server 130 may determine from a light turned on upstairs, video from a camera in the front entrance, and audio sensors, that an occupant of the property 101 is coming to open the door for a guest.

In some examples, the server 130 may detect occupancy of the property 101 or the entrance or exit of a user associated with a particular mobile device 230. For example, the server 130 may receive data over the network 105 indicating a network connectivity of a mobile device 230. In this particular example, the server 130 may receive data indicating that a user's phone 230 is connected to the WiFi of the property 101. The server 130 may then determine that the user associated with the phone 230 is within the property 101.

In some examples, the server 130 may receive data over a communication link 228, such as Bluetooth, Zigbee, etc. For example, the server 130 may receive data indicating that the monitor control unit 110 is connected with a mobile device 230 of a user over a communication link 228. The server 130 may then determine that the user associated with the mobile device 230 is within the property 101. In some examples, the server 130 may receive data indicating that the mobile device 230 is connected with an appliance 124 or a non-mobile device 280 over a communication link 228. For example, the server 130 may determine that the mobile device 230 is connected with a non-mobile device 280, such as a voice-activated home automation unit, over the communication link 228. The server 130 may then determine that a user associated with the mobile device 230 is within the property 101.

In some examples, the server 130 may receive location data, such as longitudinal, latitudinal, and altitude coordinates, a directional heading, etc. For example, the server 130 may receive GPS data indicating that the mobile device 230 is within the property 130. The server 130 may then receive GPS data indicating that the mobile device 230 has left the property 130. The server 130 may receive GPS data indicating a user is climbing up the stairs and is heading for their bedroom. In some examples, the server 130 may access pre-existing log of electronic identifiers to determine the identity of devices entering or exiting the property 101.

The process 300 may include detecting input of a command for the monitoring system with which no authentication information was provided (320). A command provided without authentication information can be a command provided by an authenticated user without authentication information. In some examples, a command provided without authentication information can be an unauthenticated command provided by an unauthenticated user. Commands can be input through various methods, such as through voice commands, through a button or switch, through gestures, through a vibration or knocking pattern, through video/image facial recognition, etc.

For example, a command can be input to the monitoring system by speaking "Unlock the door." In some examples, the command can be input to the monitoring system by pressing a button or turning a dial, such as the dial of a thermostat. In some examples, the command can be input to the monitoring system by gesturing. For example, a user can draw a circle with their hand in front of a camera 120, a sensor 122, an appliance 124, etc., to provide a command to start up an air conditioning system of the property 101. In some examples, the command can be input to the monitoring system by inputting a pattern. For example, a user may knock three times on their bedside table that is equipped with a vibration sensor to apply a scene to the monitoring system of the property 101.

In some examples, the command can be input through facial recognition. For example, a particular user can select a preferred scene or action, and the server 130 can select that preferred scene or perform the preferred action when the particular user is detected within the property 101. In some examples, the preferences of a particular user can take precedence over the preferences of another user. For example, the preferred scene of a father in the property 101 may take precedence over the preference of his son.

In some examples, the scene can be changed based on specific inputs. For example, a user can request the "Wake up" scene or the "Going to work" scene. In some examples, the scenes can be arranged in a particular order, and a user may cycle through the scenes. For example, if a user presses a button, the system may switch to the next scene.

In some examples, the system may have a threshold level of certainty regarding whether the system should execute a particular action. For example, the system may not be above a threshold level of certainty that there is occupancy within the property 101, that an authenticated user is within the property 101, etc. In these examples, the server 130 may determine that the appropriate action 132 to take is to wait for additional data to confirm. For example, the server 130 may wait to receive additional data from the same sensors 122. In some examples, the server 130 may wait to receive different data from different sensors 122, appliances 124, cameras 120, etc.

In some examples, the server 130 may transmit a notification to an authorized user. The server 130 may transmit the notification to the authorized user 104 through the authorized mobile device 140. In some examples, the server 130 may provide the notification to the user 102 who input the command. In some examples, the notification may ask the user 104 to explicitly confirm the authorization of the command provided by the user 102 without authentication information. In some examples, the server 130 may transmit the notification as a push notification, an SMS, an email, etc. The server 130 may transmit the notification to the user 104 through various devices and methods, such as through network 105, over communication link 228, through devices 230, 280, through appliances 124, through the monitor control unit 110, etc.

In some examples, the server 130 may ask the user 102 who input a command with which no authentication information was provided to provide additional information. In some examples, the server 130 may ask the authorized user 104 to provide additional information. For example, the server 130 may ask the users 102, 104 through various devices and methods, such as a voice prompt, to say their code or password. In some examples, the server 130 may ask the users 102, 104 to simply say anything, and the server 130 may use voice recognition to analyze the additional input. In some examples, the user 102 who input a command with which no authentication information was provided and the authorized user 104 are the same person.

In some examples, the server 130 may ask the users 102, 104 to provide additional information through various devices and methods, such as facial recognition, gesture passwords, etc. For example, the server 130 may ask the users 102, 104 to stand in front of a camera 120 so that the server 130 may use facial recognition to authenticate the user. In some examples, the server 130 may ask the users 102, 104 to provide a gesture password to a camera 120.

The process 300 may include analyzing the property state information against one or more rules related to commands input without authentication information (330). For example, the server 130 can receive monitoring system data from the monitoring control unit 110. The monitoring system data can include data from devices such as the cameras 120, the sensors 122, other appliances 124, and other devices and systems under the purview of the monitoring system for the property 101.

Based on the analysis, the server 130 may determine whether to perform the action corresponding to the input command or whether to perform another action that is different than the action corresponding to the input command (340). For example, the server 130 may determine, based on the property state information received, a scene to be applied to the property 101 or an action to be performed. Scenes are a set of actions or monitoring statuses that can be applied to the home automation system or property. For example, a scene may be applied to the property 101 based on an occupancy of the property 101, the time of day, the history of actions taken, etc. The server 130 may automatically determine the scene to be applied to the property 101 or the action to be performed. The server 130 may dynamically alter the scene to be applied to the property 101 or the action to be performed. For example, the server 130 may continually receive updated property state information, and may select a different scene or action based on the updated information. In some examples, the server 130 may automatically select scenes or actions to be applied to the property 101 based on historical data or patterns of activity. For example, if the owners of the property 101 usually go to bed at 10:30 p.m., at 10:25 p.m. the server 130 may begin transitioning to a "Good night" scene that controls settings of the monitoring system and connected devices to a nighttime setting.

In some examples, the server 130 may determine, based on the state of the property 101, that a command provided by the user 102 without authentication information may be executed. In some examples, the commands allowed by the server 130 may be determined based on the type of command. For example, if the motion sensor in a room with a voice-activated control device is active, and the monitoring system is not in a pre-alarm state, the server 130 may allow the monitor control unit 110 to perform voice commands. In some examples, the commands allowed by the server 130 may be determined based on the effect of the command. For example, if the camera 120 has performed facial recognition in the room in which a voice command is being issued and the user 102 has been confirmed as an authorized user 104, the server 130 may allow commands that lower the state of security of the property 101. For example, the server 130 may allow a command to disarm the security system to be executed without authentication information.

Based on analyzing the property state information and the input command against one or more rules, the server 130 may also determine to perform various other actions that are different than the action corresponding to the input command. For example, the server 130 may determine to generate and send a notification to a user's computing device. In some examples, the server 130 may determine to generate and send an authorization request to a user's computing device. In some cases, the server 130 may generate an alarm condition.

In some examples, the commands allowed by the server 130 depend on the location from which the command is given. For example, if a button inside the property 101 is pressed and the system is not in pre-alarm, no authentication is needed to make the property 101 less secure.

In some examples, the server 130 may determine whether to perform the action corresponding to the unauthenticated input command based on the security impact of the command. The security impact of the command may depend, for instance, on the device implicated in the command or the action commanded. For example, the server 130 may determine that an input command to adjust a device of the property that is not important to security (e.g., a thermostat, lights, blinds, a sprinkler system, etc.) may have a low security impact, whereas an input command to adjust a device of the property that is important to security (e.g., monitoring system status, door or window locks, etc.) has a higher security impact. As another example, the server may determine that an input command to increase the security of the property (e.g., arm the monitoring system, lock the doors) has a lower security impact than an input command to decrease the security of the property (e.g., disarm the monitoring system, unlock the doors).

The server 130 may determine the security impact by accessing a table of input commands. Each input command may correspond to a different security impact score. The security impact of adjusting a light may be one. The security impact of disarming the monitoring system may be five. In this case, the range of security impact scores may be between one and five. In some implementations, a resident of the property may adjust the security impact scores to reflect a specific security impact that may be particular to the property. In some implementations, the server 130 may update the security impact score table using machine learning. For example, a resident who may not authorize any unauthenticated adjustments to the thermostat may cause the sever 130 to increase the security impact score of adjusting the thermostat.

The server 130 may analyze the property state information, the security impact of the command, and the input command itself against one or more rules to determine whether to perform the action corresponding to the unauthenticated input command or whether to perform another action. For example, the server 130 may determine that an unauthenticated command to adjust the thermostat has a low security impact and that, as a result, the server 130 may adjust the thermostat as requested by the command. Alternatively, the server 130 may determine that an unauthenticated command to lower the security of the property by disarming the monitoring system has a high security impact. As a result, the server 130 may determine that it will generate and provide an authorization request to the computing device of a user.

The server 130 may limit each scene or action to be performed by historical data, activity patterns, etc. For example, if a command is being input without authentication information at a time of day when the owners are normally at work, the server 130 may ask the user 102 to provide further authentication information. In some examples, if a command is being input without authentication information around dinner time and the server 130 has determined from data provided by the cameras 120 that guests that have previously been inside the property 101 are arrive, the server 130 may allow a user to provide an "Open door" command without authentication information.

In some examples, the server 130 is integrated with data not associated with the property 101 or the monitoring system. For example, the server 130 may be granted access to calendars, schedules, contacts, etc. of users 102, 104. The server 130 may determine that the owners of the property 101 are going on vacation, and may automatically select a "Long-term away" scene to apply to the property 101. In some examples, the server 130 may determine that the owners of the property 101 are hosting an event at the property 101, and may access the owners' contacts to use facial recognition and allow commands to be input without authentication information by the guests. The server 130 may revoke command access by the guests once they leave, even if they are recognized users.

In some examples, the server 130 updates a scene to be applied to the property 101 or an action to be performed based on property state information collected at the time the command is given by the user 102. For example, if the user 102 walks into the living room, flips on the lights, and says "turn on the TV to BBC," the server 130 may determine, using data from the cameras 120, that the user 102 is the homeowner, and allow the command without authentication information.

In some examples, the server 130 allows commands based on sensed behavioral activity. For example, the server 130 may use patterns of behavior that indicate that the user 102 providing the command without authentication information has good intentions. For example, if the user 102 is requesting to lock the doors at nighttime or turn on the security system from the garage, the server 130 may determine that the actions are increasing the security of the home, and that the commands are normally given by the homeowner of the property 101, and allow the commands.

The server 130 may prevent commands from being executed or require authentication under certain circumstances and states of the property. For example, if a "Good night" scene is applied to the property 101 and a user 102 attempts to provide a voice command to disarm the security system by yelling it through the door, the server 130 may prevent the command from being executed, and may issue a notification to an authorized user 104.

The server 130 may use multiple mechanisms to prevent harmful commands from being provided. For example, the server 130 may use a combination of a valid detected presence of a homeowner or authorized user of some sort and multiple factors that either do or do not suggest the command is validly being given. For example, if the server 130 determines that an authorized user 104 is active within the property 101, but that the user is upstairs in the study and a command is being input without authorization in the basement, the server 130 may prevent the command from being executed or may require authorization.

An authorized user 104 or homeowner may have total control over the extent of authentication required, the types of commands allowed, the users that are authenticated, etc. In some examples, the user 104 may specify the exact criteria that trigger the lowering of authentication standards. For example, the user 104 may provide settings to the server 130 that instruct the server 130 to only apply a certain scene or to perform a certain action when an explicit set of events occur.

In some examples, the server 130 may allow a user to opt-in to a fuzzy learning process through which the server 130 may learn a user's typical behavior and update settings, criteria, etc. for scenes to be applied to the property 101 or for actions to be performed. For example, the server 130 can store historical data and access the data to determine whether a command or an action taken is typical of an identified user. In some examples, the user may specify a certain threshold of certainty or confidence needed to allow a command to be executed without authentication information, or with less authentication information. For example, the user 104 may specify that unless voice recognition is at least 80% certain that the user 102 providing the command without authentication information is a homeowner or authorized user, the server 130 will not allow the command to be executed. In some examples, the server 130 can determine that a second factor of authentication is needed. For example, the server 130 may request facial recognition data, a password, etc. as described above.

In some examples, the server 130 can change the level of authentication needed to provide a command. For example, the server 130 can allow commands to be provided without authentication information. In some examples, the server 130 can reduce the level of authentication required. For example, the server 130 can require that only the 4-digit PIN is required to disarm the security system, instead of the 15-character password. In some examples, the server 130 can increase the level of authentication required. For example, the server 130 can require that a physical button press be provided in addition to a voice command.

In some examples, the server 130 can determine the level of authentication or level of automation to provide based on the threshold of certainty. For example, if the server 130 is at or above its highest threshold of certainty, the server 130 may apply a scene that automatically performs commands without any input required or automatically perform actions on behalf of a user without any input required. In this example, if the server 130 is between its highest threshold of certainty and a high threshold, the server 130 may apply a scene that performs commands upon input without additional authentication information. If the server 130 is between its high threshold and its medium-high threshold, the server 130 may apply a scene that allows commands to be executed upon input with single-factor authentication. If the server 130 is between its medium-high threshold and its medium threshold, the server 130 may apply a scene to the property 101 that allows commands to be executed upon input with multi-factor authentication. In some examples, if the server is at or below a very low threshold of certainty, the server 130 may apply a scene that denies the input and requires central station authentication to perform the command. For example, the server 130 may require a worker at a central station associated with the monitoring system of the property 101 to confirm that the user 102 is an authorized user.

In some examples, a user's preferences and scenes may be stored on the server 130 and may be transmitted to other properties 101 and other monitoring systems. For example, if a user goes on vacation to a beach house, the user may apply their scene settings to the beach house. In some examples, if the user owns multiple properties, or if the user is a property management company, the user can control scenes for multiple properties by changing the settings of their scenes.

Figure 3B:
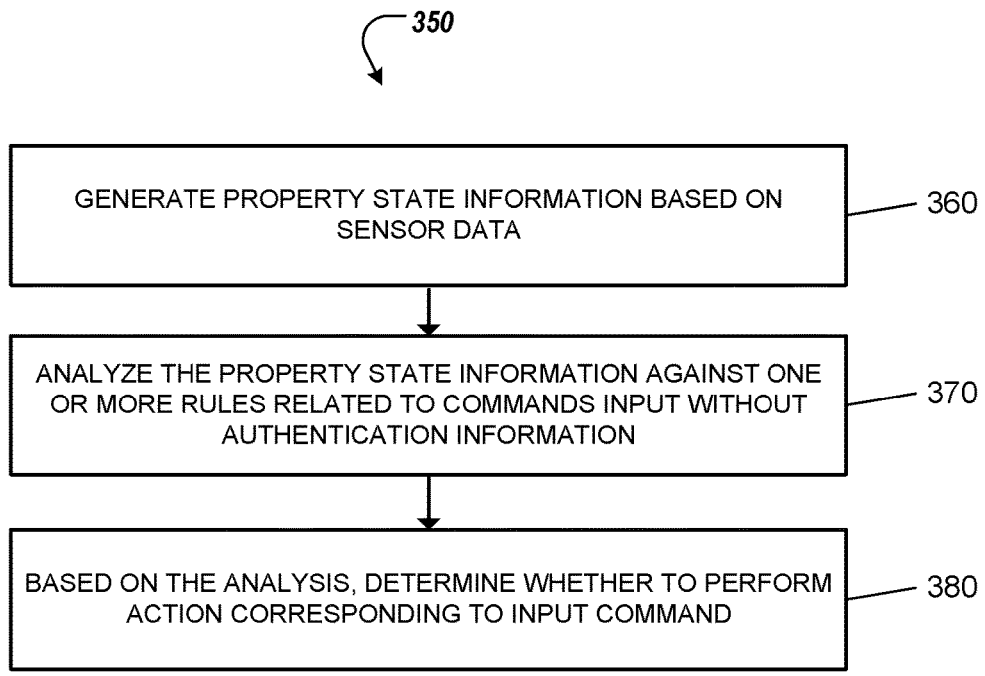

FIG. 3B illustrates an example of a process 350 of automatically taking action related to a monitoring system based on commands provided without authentication information. In some examples, the process 350 includes performing actions based on the state of the property and automatically taking action. Briefly, the process 300 may include generating property state information based on senor data (360), analyzing the property state information against one or more rules related to commands input without authentication information (370), and based on the analysis, determining whether to perform the action corresponding to the input command or whether to perform a different action (380).

In more detail, the process 350 includes generating property state information based on sensor data (360). The process 350 may be similar to the process 300. In some examples, the system may behave in similar ways in process 300 and process 350. For example, the system may behave in a similar manner in process 350 as in process 300 at 310 and 360.

The process 350 may include analyzing the property state information against one or more rules related to commands input without authentication information (370).

In some examples, the server 130 can determine the level of authentication or level of automation to provide based on the threshold of certainty. For example, if the server 130 is at or above its highest threshold of certainty, the server 130 may apply a scene that automatically performs commands without any input required. In this example, if the server 130 is between its highest threshold of certainty and a high threshold, the server 130 may apply a scene that performs commands upon input without additional authentication information.

In some examples, a user's preferences and scenes may be stored on the server 130 and may be transmitted to other properties 101 and other monitoring systems. For example, if a user goes on vacation to a beach house, the user may apply their scene settings to the beach house. In some examples, if the user owns multiple properties, or if the user is a property management company, the user can control scenes for multiple properties by changing the settings of their scenes. In some examples, scenes for multiple properties can be controlled automatically. For example, scenes can be controlled based on external data such as the weather, the occupancy, an expected occupancy, etc.

In some examples, scenes may be modified based on the threshold of certainty that the server 130 has. For example, if the server 130 is less than 60% confident that a user has woken up and that it is time to apply the "Wake up" scene or to perform an action or set of actions defined by the "Wake up" scene, the server 130 may allow certain automatic actions, such as turning on the lights and starting the coffee maker, without allowing other automatic options, such as disarming the security system.

The process 350 may include determining whether to perform an action corresponding to the input command or to perform a different action (380). For example, if the server 130 determines that the property 101 is in a secure state (e.g., the server 130 has received data indicating a "Secure" scene should be applied to the property 101 and the server 130 has confirmed that an authorized user 104 is within the property 101) the server 130 may allow commands to be executed automatically without requiring authentication.

In some examples, if it is early in the morning, around when an authorized user 104 typically wakes up, and the security system is not in an alarm state, if the monitor control unit 110 provides the server 130 with information that aligns with the user 104's typical routine, the server 130 may apply a "Wake up" scene to the property 101 and perform a sequence of actions associated with the "Wake up" scene with a lower level of authentication required. For example, if the server 130 receives data from the monitor control unit 110 indicating that the security system is in an armed stay mode and data from the sensors 122 that indicate motion in the upstairs bedroom, vibration in the hall, light turned on at the stairs, and then motion in kitchen, the server 130 may determine that this pattern of property state information and sensor events aligns with the homeowner's typical morning routine, so the server 130 applies a "Wake up" scene with a lower level of authentication to the property 101. In some examples, if the server 130 has a threshold level of certainty, the server 130 may automatically perform actions associated with the "Wake up" scene (e.g., starting the coffee maker, opening the blinds, etc.).

In some examples, if the server 130 detects an abnormality in the state of the property 101, the server 130 may require additional authentication information. For example, the server 130 may require a voice command to apply the "Wake up" scene to the property 101 to be provided before automatically performing the actions associated with the scene. In some implementations, the server 130 may require a voice command to begin performing actions associated with the "Wake up" scene.

In some examples, the server 130 may determine to generate a notification, an authorization request, or an alarm condition in response to its analysis of the property state information.

Figures 4A, 4B, 4C:
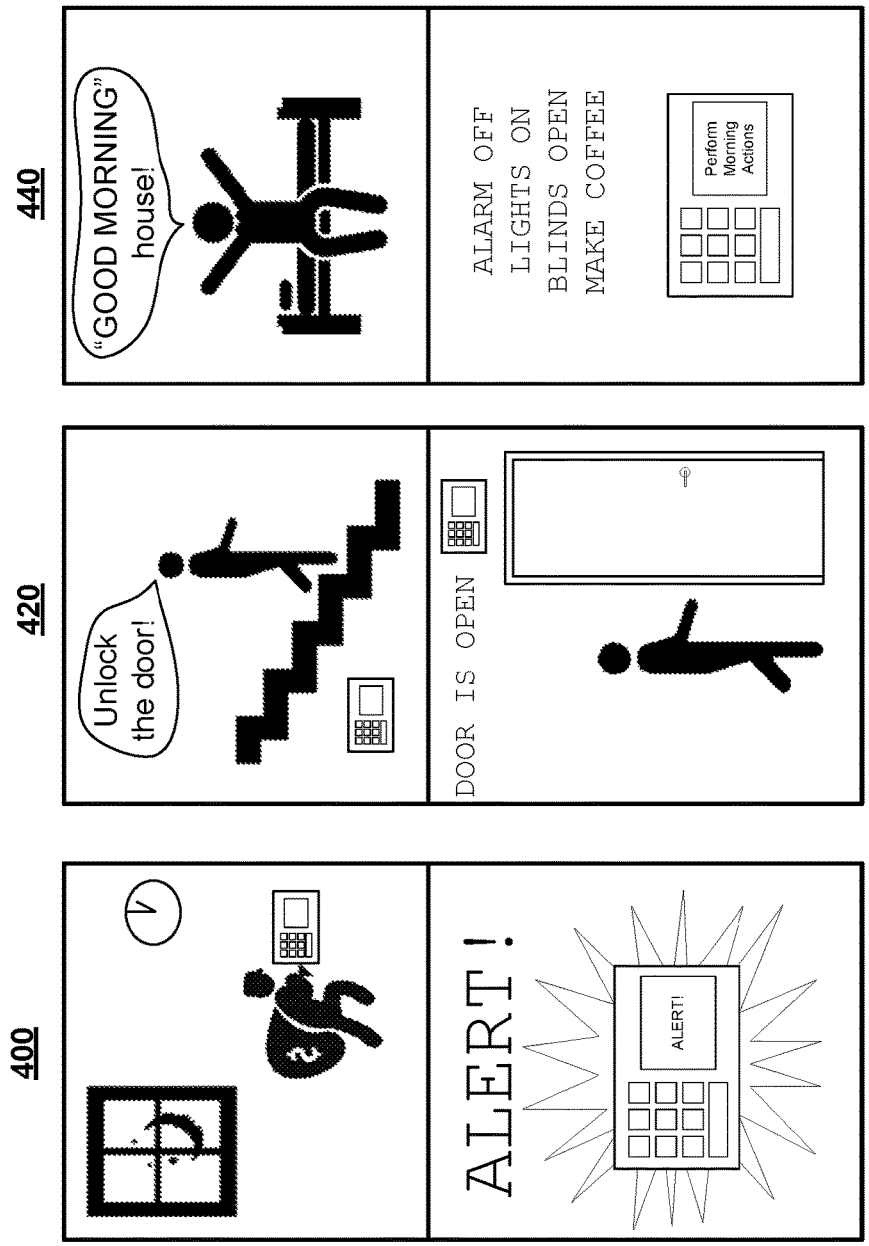

FIG. 4A illustrates a diagram of an example scenario 400 in which a "Good night" scene is applied to the property 101, and a user (in this case, a thief) provides a command without authorization information. In this particular example, it is nighttime, and the security system of the property 101 is armed. The scene applied to the property 101 may be any scene that arms the security system. In some examples, the thief may attempt to disarm the security system by pressing the disarm button.

In this example, the server 130 receives state information indicating that all authorized users in the property 101 are upstairs in bed and have not moved in two hours. The server 130 receives the button press at the security system interface, and compares the command with the scene applied to the property 101 and various other property state information. In this particular example, the property 101 has a nighttime scene, such as a "Good night" scene which involves locking the doors, arming the security system in a stay mode, monitoring the doors and windows, rejecting commands provided without authentication information, and sending a notification to authorized users when an abnormal event, such as a command provided without authentication information, is detected.

The server 130 may determine that it is nighttime, that no movement was detected from the upstairs bedrooms to the security system where the button was pressed. The server 130 may also receive data from the sensors 122 that a window on the first floor was opened. In some examples, the server 130 may compare the button press without authentication information with the rules associated with the "Good night" scene and determine that an alert or notification is to be sent to authorized users notifying them of the attempted disarm event. In some examples, the server 130 may determine that an alarm condition is to be generated.

In some examples, nighttime scenes may include actions such as arming the security system, turning off all interior lights and turning on exterior lights, locking doors, turning off appliances, etc.

FIG. 4B illustrates a diagram of an example scenario 420 in which a user provides a command. In this particular example, the user is inside of the property 101, and the user is shown coming down the stairs and providing a voice command to a monitor control unit 110 on the first level. The user provides a voice command to "Unlock the door." In some examples, there is only one door that is unlockable in the property 101. In some examples, the server 130 is able to determine which door the user is referring to, based on the user's location within the property 101 and where the command is being given. For example, the user is shown heading down the stairs toward the front door, and the monitor control unit 110 that receives voice commands is also downstairs. The server 130 may then determine that the "Unlock" command is directed to the front door.

In some examples, the server 130 may have a low level of certainty and may request addition authentication information. For example, the user may be moving down the stairs too quickly and the server 130 may not have a clear image to perform facial recognition on to determine that the user is authorized. In some examples, a scene is applied to the property 101 or an action is performed that allows commands to be executed without authentication information.

In some examples, the server 130 uses the current state to determine whether applying a scene or changing settings requires additional or less authentication. In some examples, the server 130 applies scenes based on input from a user. For example, the server 130 can determine that a user has pressed a button programmed to apply the "I'm home for the night" scene to the property 101.

In some examples, the server 130 applies the scenes or performs actions based on the user. For example, the server 130 may maintain data on multiple valid users. In some examples, the server 130 can determine, from sensor data, that more than one valid user is present. For example, if a person is coming down the stairs with their child, the server 130 may require further authentication when a command is given by the child. In some examples, the server 130 may always require further authentication when a child (or other unauthorized user) is present.

In some examples, the server 130 detects different users through different data. For example, the server 130 may be set to only allow commands from a child if the child's face is detected. In some examples, the server 130 detects a particular user through a particular method. For example, the server 130 may only set a high confidence level if an owner of the house is detected through voice recognition and device connectivity with the network.

FIG. 4C illustrates a diagram of an example scenario 440 in which a user provides an input to apply a specific scene to the property 101. In this particular example, the user has just woken up and says "'GOOD MORNING' house!" In some examples, the server 130 can use speech recognition to parse a user's words for certain command words. For example, "GOOD MORNING" can be a command to apply the "Wake up" scene to the property or to initiate performance of actions defined by the "Wake up" scene. In some examples, the user can change these command words.

In some examples, a "Wake up" scene can perform a number of actions relevant to waking up, such as disarming the security system, turning on the lights, opening the blinds, starting the coffee maker, etc. In some examples, the user can trigger the "Wake up" scene through various methods, such as a voice input, gestures, etc. For example, the user may knock three times on their bedside table, which contains a sensor, to initiate the "Wake up" scene. In some examples, the user can simply press a button that applies the "Wake up" scene or that initiates performance of a set of actions associated with the "Wake up" scene.

In some examples, the server 130 receives property state information that allows it to determine when a user is waking up, and whether to apply the "Wake up" scene or to perform actions related to the "Wake up" scene. In some examples, if the server 130 is below a certainty threshold, the server 130 may wait for input from the user to specifically request initiation of the "Wake up" scene.

FIG. 4D illustrates a diagram of an example scenario 460 in which a guest, or a non-authenticated user, attempts to provide a command to the monitoring system of the property 101. In some examples, the guest is a house guest, or a guest who is staying in the property 101 for an extended period of time. In some examples, the guest is a worker or some other kind of guest who will only remain in the property for a short period of time.

In this example, the guest is attempting to change the temperature of the property 101 through a button press without authentication information. The server 130 detects that the scene applied to the property 101 includes notifying an authorized user of the guest's attempted actions. In some examples, the notification includes the guest's name. In some examples, the notification includes a prompt allowing the authorized user to allow or deny executing the command provided by the guest.

In some examples, if the server 130 knows there is a guest within the property 101 or detects a guest, the server 130 may lower certainty thresholds required before additional authentication is required, modify behavior models and activity patterns to account for the presence of the guest, etc. For example, a homeowner can provide input to the server 130 indicating that guest is staying within the property 101. The server 130 can then react to the input. For example, if the guest is staying in the basement, motion in the basement by the guest does not impact the "Wake up" scene invocation or any actions to be performed. In some examples, the user may allow the guest to trigger routine scenes. In some examples, the user may input preferences to temporarily alter actions associated with scenes for the duration of the guest's stay.

In some examples, the server 130 can automatically apply a "Guest" scene to the property 101 or perform a set of actions related to the "Guest" scene based on facial recognition, social media or calendar information, etc. provided by the user, or various other data. In some implementations, each guest may have their own personalized scenes or set of actions. For example, the server 130 can determine from Sarah's calendar that her sister Claire is visiting for the weekend, and can prepare to transition to the "Claire-Guest" scene.

In some examples, the property 101 is a rental property, and the guests are patrons. In these examples, the guests may be limited in the settings they are able to alter. In some examples, the guests may be able to bring scenes from their own homes to the property 101. Guest scenes can be activated for a scheduled period of time, and access may be revoked after that period of time, even if the guests are recurring.

In some examples, the guests are workers, such as repairmen or a cleaning service. In some examples, the cleaners may come to clean the property every week. A "Cleaners-Guest" scene may be applied to the property 101 by the server 130 for the scheduled time period that the cleaners are to visit. For example, the "Cleaners-Guest" scene may include unlocking the door upon facial recognition at the front door, allowing access to the rooms, unlocking windows, etc. In some examples, once the cleaners leave, the server 130 will determine that there is no guest occupancy and automatically apply an "Unoccupied" scene or perform a set of actions associated with an "Unoccupied" scene. In some examples, the worker guests are held a higher authentication level, and are required to enter a code, such as a guest user code. In some examples, worker guests must be let into the property 101. For example, an authorized user 104 may receive video data from the cameras 120 to verify the identity of the workers before unlocking the doors. In some examples, worker guests must be allowed into the property 101 by a user from inside the property 101.

In some examples, behavior and activity data collected by the monitoring system while the guests or workers are in the property 101 or after a guest scene is applied to the property 101 may be used as input to the server 130. The server 130 may use the data to determine abnormal behavior or detect abnormal events. The data can be used to adjust actions and settings of certain scenes. For example, patterns of behavior can be adjusted while the "Worker-Guest" scene is applied. While a command may come from inside the property 101 while a user is detected in the same room as the monitor control unit 110, the certainty threshold that must be reached without requiring additional authentication data may be raised. For example, a certainty threshold that a user is authenticated may be raised from 70% to 90% when a guest is in the property 101.

FIG. 4E illustrates a diagram of an example scenario 480 in which the user 102 commands the server 130 to apply a scene or action that includes arming the system for the daytime. For example, the server 130 may apply an "Off to work" scene to the property 101 to adjust the thermostat to conserve energy, turn off certain lights, and open the garage door, allowing the user to leave the house quickly. The "Off to work" scene can include other actions such as locking the windows, turning off all appliances, etc.

In some implementations, the user 102 is not inside of the building on the property 101. For example, the user 102 may be on the perimeter of the property 101, or in the yard or parking lot of the property 101. In the example scenario 480, the user 102 is on the steps outside of the home on property 101 and, from outside the home, commands the server 130 to apply the "Off to work" scene. In some implementations, the server 130 may analyze the property state against a different set of rules depending upon whether the user 102 is inside of or outside of the property 101.

FIG. 4F illustrates a diagram of an example scenario 490 in which the server 130 applies a scene or action when the user 102 is not inside of the property 101. For example, the user 102 may be returning home from work. In some examples, the server 130 may apply a scene or perform an action that includes readying the property 101 for occupancy. In example scenario 490, the server 130 applies an "Arriving home" scene to the property 101 to readjust the thermostat for the homeowners' preferences, turn on the lights, open the garage door, and start the oven for dinner. The "Arriving home" scene can include other actions, such as opening the blinds.

In some examples, the server 130 determines that a user is on their way home. For example, the server 130 may receive GPS data indicating that a user has left their place of work and is travelling in the direction of the property 101. The server 130 may determine that a user is on their way home through various methods, such as using GPS data, using network connectivity data, using communication link 228, 288, etc. For example, the server 130 may determine that the user 102 is right outside of the property 101 based on detecting that a mobile device of the user 102 is connected to a WiFi network of the property 101.

In some examples, the server 130 may allow the user 102 to provide unauthenticated commands within a predetermined distance of the property 101. For example, the server 130 may allow the user 102 to provide an unauthenticated command to open the garage door of the property 101 when they are within one mile of the property 101. The server 130 may allow the user 102 to provide an unauthenticated command to turn on exterior lights of the property 101 or disarm the security system of the property 101 when the user 102 is determined to be less than half of a mile from the property 101. In some examples, the predetermined distance is determined by the users 102 or 104. In some examples, the predetermined distance is determined by the server 130. In some examples, the user 102 may provide the unauthenticated command to the server 130 through a voice link of the user's car. In some examples, the server 130 may receive data from other sensors of the user's car (e.g., through an OBDII sensor) and, based on that data, determine whether to apply a scene to the property 101.

In some examples, the server 130 may prompt the user 102 to provide an unauthenticated command when the user 102 is within a predetermined distance of the property 101. For example, if the user 102 is detected to be within a quarter of a mile of the property 101, the server 130 may prompt the user to provide a command to open the garage door. In some examples, the server 130 may ask a user if they wish to allow a command to be performed. For example, the server 130 may ask the users 102, 104 to confirm that they would like to disarm the security system and open the garage door.

In some examples, the server 130 may allow unauthenticated commands when a user is detected near the property 101 and a second form of authentication is confirmed. For example, if the user's mobile device is paired to the user's vehicle through a short-range communication link, such as Bluetooth, the server 130 may allow the user 102 to provide an unauthenticated command to open the garage door.

In some examples, the server 130 may allow unauthenticated commands when a user parks on the street near the property 101. For example, if the user 102 and/or their car is detected within a predetermined distance of the property 101, the server 130 may allow the user to provide commands to unlock the front door and/or disarm the security system. In some examples, the server 130 may allow the user 102 to provide unauthenticated commands for a short period of time once their car is detected within a predetermined distance of the property 101. For example, if the user 102 arrives home from work and parks on the street, their car may send a notification to the server 130 announcing that the user 102 has arrived at the property 101. In some examples, the server 130 may allow the user 102 to provide unauthenticated commands within a short, predetermined period of time (e.g., five minutes, thirty seconds, etc.) of their car sending the server 130 a notification that the car has been parked and turned off. In some examples, the server 130 may determine that the user's car has been turned off by determining that a short-range communication link between the car and the user's mobile device has been lost. For example, the server 130 may determine that the user's car has been turned off by detecting that the Bluetooth pairing between the user's car and the user's mobile device has been disconnected.

While examples have been given that describe scenarios in which users are arriving at the property 101, it is contemplated that the server 130 may allow unauthenticated commands to be provided in the same manner when a user is departing the property 101. For example, if a user is detected within 50 feet of the property 101, the server may allow the user to provide an unauthenticated command to close the garage door. In some examples, the server 130 may prompt the user to provide an unauthenticated command or to confirm that an action or set of actions is to be taken upon their departure from the property 101. For example, the server 130 may ask the user whether they would like to arm the security system, lock the front door, and close the garage door once the system detects that the user is leaving (e.g., by detecting no occupancy of the property 101, by detecting the opening and closing of the side door and the loss of connection between the user's mobile device and a network within the property 101, etc.).

In some examples, the server 130 applies the scenes or performs actions automatically based on the user's history and preferences. For example, if a user is detected to be arriving home, and the user has arrived home within an hour of that time every day for the past two weeks, the server 130 may allow the user to provide an unauthenticated command. In some examples, the range of time within which the user has arrived home may be determined by the server 130. In some examples, the range of time within which the user has arrived home may be determined by the users 102, 104. In some examples, the user may commute weekly, and the time at which the user typically arrives home is a particular day of the week.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system comprising:
one or more sensors that are located throughout a property;
a monitoring control unit that is configured to:
receive data collected by the one or more sensors located throughout the property; and
generate property state information based on the data collected by the one or more sensors; and
an input device that is configured to:
detect an input command to adjust an electronic device, wherein the input command does not include authentication information for the monitoring control unit to authenticate the input command before adjusting the electronic device,
wherein the monitoring control unit is further configured to:
receive, from the input device, data identifying the input command that does not include the authentication information for the monitoring control unit to authenticate the input command before adjusting the electronic device;
analyze the property state information and the input command against one or more rules that are related to authorizing additional input commands that are received by the monitoring system without the authentication information; and
based on analyzing the property state information and the input command against the one or more rules, determine whether to adjust the electronic device or generate (i) an alarm condition or (ii) a notification.

2. The monitoring system of claim 1, wherein:
the monitoring system is in an armed state,
the property state information indicates that an expected number of occupants are located in a particular area of the property,
the input command comprises a command to disarm the monitoring system provided from a location outside of the particular area of the property, and
the monitoring control unit is further configured to:
based on analyzing the property state information and the input command against the one or more rules, determine that the command to disarm the monitoring system is not authorized; and
determine whether to adjust the electronic device or generate (i) the alarm condition or (ii) the notification by determining to generate the alarm condition based on determining that the command to disarm the monitoring system is not authorized.

3. The monitoring system of claim 1, wherein:
the property state information indicates that a user is located inside the property,
the data collected by the one or more sensors located throughout the property includes an image of the user,
the input command comprises a voice command uttered by the user located inside the property, and
the monitoring control unit is further configured to:
based on analyzing the property state information and the input command against the one or more rules, determine whether to adjust the electronic device or generate (i) the alarm condition or (ii) the notification by:
analyzing an image of the user captured by the monitoring system;
based on analyzing the image of the user, determining that the user is an authorized user; and
based on determining that the user is an authorized user, determining that the voice command is authorized; and
determining to adjust the electronic device based on determining that the voice command is authorized.

4. The monitoring system of claim 1, wherein:
the input command comprises a voice command uttered by a user located inside the property,
the property state information indicates that the user is located inside a bedroom of the property and that the user was likely sleeping before uttering the voice command, and
the monitoring control unit is further configured to:
based on analyzing the property state information and the input command against the one or more rules, determining that the voice command is authorized; and
determine whether to adjust the electronic device or generate (i) the alarm condition or (ii) the notification by determining to adjust the electronic device based on determining that the voice command is authorized.

5. The monitoring system of claim 4, wherein:
the monitoring control unit is further configured to adjust the electronic device based on determining that the voice command is authorized by performing one or more of:
disarming the monitoring system;
activating one or more lights that are located in the property;
raising one or more window coverings that are located in the property; and
activating an appliance that is located in the property.

6. The monitoring system of claim 1, wherein:
the property state information indicates that a resident of the property is outside of the property,
the electronic device is located at the property,
the monitoring control unit is further configured to:
determine a security impact of the input command to adjust the electronic device of the property;
based on (i) analyzing the property state information that indicates that the resident of the property is outside of the property, (ii) the security impact of the input command to adjust the electronic device of the property, and (iii) the input command to adjust the electronic device of the property against the one or more rules, generate an authorization request to adjust the electronic device of the property;
provide, to a computing device of the resident of the property, the authorization request to adjust the electronic device of the property;
receive, from the computing device of the resident of the property, authorization to adjust the electronic device of the property; and
determine whether to adjust the electronic device or generate (i) the alarm condition or (ii) the notification by determining to adjust the electronic device based on receiving the authorization to adjust the electronic device of the property.

7. The monitoring system of claim 6, wherein:
the command to adjust the electronic device of the property was received locally at the electronic device, and
the monitoring control unit is further configured to:
based on (i) analyzing the property state information that indicates that the resident of the property is outside of the property, (ii) the security impact of the input command to adjust the electronic device of the property, and (iii) the local command to adjust the electronic device of the property against the one or more rules, generate an authorization request to adjust the electronic device of the property.

8. The monitoring system of claim 1, wherein the monitoring control unit is further configured to:
receive additional data collected by the one or more sensors during a period of time before detecting the input command;
determine an activity pattern of persons in the property based on the additional data collected by the one or more sensors during the period of time before detecting the input command;
update the property state information based on the activity pattern of persons in the property;
analyze the property state information and the input command against the one or more rules that are related to authorizing the additional input commands that are received by the monitoring system without authentication information by analyzing the updated property state information and the input command against one or more rules that are related to authorizing the additional input commands that are received by the monitoring system without authentication information; and
based on analyzing the property state information and the input command against the one or more rules, determine whether to adjust the electronic device or generate (i) the alarm condition or (ii) the notification by determining whether to adjust the electronic device or generate (i) the alarm condition or (ii) the notification based on analyzing the updated property state information and the input command against the one or more rules.

9. The monitoring system of claim 1, wherein the monitoring control unit is further configured to:
determine an energy consumption of the property and conditions in or near a property; and
based on the energy consumption of the property, at least one user-specified setting, and the conditions in or near the property, generate the one or more rules that are related to authorizing the additional input commands that are received by the monitoring system without authentication information.

10. The system of claim 9, wherein the conditions in or near the property include weather, daylight level, air quality, and other environmental conditions.

11. The monitoring system of claim 1, wherein:
the property state information indicates that a resident is leaving the property,
the input command comprises a voice command uttered by the resident while leaving the property, and
the monitoring control unit is further configured to:
based on analyzing the property state information and the input command against the one or more rules, determine whether to adjust the electronic device or generate (i) the alarm condition or (ii) the notification by:
based on analyzing the property state information indicating that the resident is leaving the property and the voice command uttered by the resident while leaving the property, determining that the user is an authorized user; and
based on determining that the user is an authorized user, determining that the voice command is authorized; and
determining to adjust the electronic device based on determining that the voice command is authorized by performing one or more of:
arming the monitoring system;
deactivating one or more lights of the property;
locking one or more doors of the property; and
adjusting a thermostat of the property.

12. The monitoring system of claim 1, wherein:
the property state information indicates that a resident is arriving at the property,
the input command comprises a voice command uttered by the resident while arriving at the property, and
the monitoring control unit is further configured to:
based on analyzing the property state information and the input command against the one or more rules, determine whether to adjust the electronic device or generate (i) the alarm condition or (ii) the notification by:
based on analyzing the property state information indicating that the resident is arriving at the property and the voice command uttered by the resident while arriving at the property, determining that the user is an authorized user;
based on determining that the user is an authorized user, determining that the voice command is authorized; and
determining to adjust the electronic device based on determining that the voice command is authorized by performing one or more of:
disarming the monitoring system;
activating one or more lights of the property;
opening one or more doors of the property;
adjusting a thermostat of the property; and
activating an applicant located in the property.

13. A computer-implemented method, comprising:
receiving, by a monitoring system that is configured to monitor a property,
property state information that includes data collected by one or more sensors located throughout the property;
receiving, by the monitoring system, an input command to adjust an electronic device does not include authentication information for the monitoring system to authenticate the input command before performing adjusting the electronic device;
analyzing, by the monitoring system, the property state information and the input command against one or more rules that are related to authorizing additional input commands that are received by the monitoring system without authentication information; and
based on analyzing the property state information and the input command against the one or more rules, determining, by the monitoring system, whether to adjust the electronic device or generate (i) an alarm condition or (ii) a notification.

14. The method of claim 13, wherein:
the monitoring system is in an armed state,
the property state information indicates that an expected number of occupants are located in a particular area of the property,
the input command comprises a command to disarm the monitoring system provided from a location outside of the particular area of the property, and
the method further comprises:
based on analyzing the property state information and the input command against the one or more rules, determining that the command to disarm the monitoring system is not authorized; and
determining whether to adjust the electronic device or generate (i) the alarm condition or (ii) the notification comprises determining to generate the alarm condition based on determining that the command to disarm the monitoring system is not authorized.

15. The method of claim 13, wherein:
the property state information indicates that a user is located inside the property,
the data collected by the one or more sensors located throughout the property includes an image of the user,
the input command comprises a voice command uttered by the user located inside the property,
the method further comprises:
based on analyzing the property state information and the input command against the one or more rules, determining, by the monitoring system, whether to adjust the electronic device or generate (i) the alarm condition or (ii) the notification comprises:
analyzing an image of the user captured by the monitoring system;
based on analyzing the image of the user, determining that the user is an authorized user; and
based on determining that the user is an authorized user, determining that the voice command is authorized, and
determining to adjust the electronic device based on determining that the voice command is authorized.

16. The method of claim 13, wherein:
the input command comprises a voice command uttered by a user located inside the property,
the property state information indicates that the user is located inside a bedroom of the property and that the user was likely sleeping before uttering the voice command,
the method further comprises:
based on analyzing the property state information and the input command against the one or more rules, determining that the voice command is authorized, and
determining whether to adjust the electronic device or generate (i) the alarm condition or (ii) the notification comprises determining to adjust the electronic device based on determining that the voice command is authorized.

17. The method of claim 16, wherein:
determining to adjust the electronic device based on determining that the voice command is authorized comprises performing one or more of:
disarming the monitoring system;
activating one or more lights that are located in the property;
raising one or more window coverings that are located in the property; and
activating an appliance that is located in the property.

18. The method of claim 13, wherein:
the property state information indicates that a resident of the property is outside of the property,
the electronic device is located at the property,
the method further comprises:
determining a security impact of the input command to adjust the electronic device of the property;
based on (i) analyzing the property state information that indicates that a resident of the property is outside of the property, (ii) the security impact of the input command to adjust the electronic device of the property, and (iii) the input command to adjust the electronic device of the property against the one or more rules, generating an authorization request to adjust the electronic device of the property;
providing, to a computing device of the resident of the property, the authorization request to adjust the electronic device of the property; and
receiving, from the computing device of the resident of the property, authorization to adjust the electronic device of the property, and
determining whether to adjust the electronic device or generate (i) the alarm condition or (ii) the notification comprises determining to adjust the electronic device based on receiving the authorization to adjust the electronic device of the property.

19. The method of claim 13, further comprising:
receiving, by the monitoring system, additional data collected by the one or more sensors during a period of time before detecting the input command;
determining an activity pattern of persons in the property based on the additional data collected by the one or more sensors during the period of time before detecting the input command;
updating the property state information based on the activity pattern of persons in the property;
analyzing the property state information and the input command against the one or more rules that are related to authorizing the additional input commands that are received by the monitoring system without authentication information by analyzing the updated property state information and the input command against one or more rules that are related to authorizing the additional input commands that are received by the monitoring system without authentication information; and
based on analyzing the property state information and the input command against the one or more rules, determine whether to adjust the electronic device or generate (i) the alarm condition or (ii) the notification by determining whether adjust the electronic device or generate (i) the alarm condition or (ii) the notification based on analyzing the updated property state information and the input command against the one or more rules.

20. The method of claim 13, further comprising:
determining an energy consumption of the property and conditions in or near a property; and
based on the energy consumption of the property, at least one user-specified setting, and the conditions in or near the property, generating the one or more rules that are related to authorizing the additional input commands that are received by the monitoring system without authentication information.

* * * * *